US012664638B2

(12) United States Patent
Imai

(10) Patent No.: US 12,664,638 B2
(45) Date of Patent: Jun. 23, 2026

(54) STATE DETERMINATION APPARATUS, STATE DETERMINATION METHOD, AND COMPUTER-READABLE RECORDING MEDIUM

(71) Applicant: NEC Corporation, Tokyo (JP)

(72) Inventor: Hiroshi Imai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 341 days.

(21) Appl. No.: 18/292,975

(22) PCT Filed: Aug. 6, 2021

(86) PCT No.: PCT/JP2021/029402
§ 371 (c)(1),
(2) Date: Jan. 29, 2024

(87) PCT Pub. No.: WO2023/013058
PCT Pub. Date: Feb. 9, 2023

(65) Prior Publication Data
US 2025/0078287 A1      Mar. 6, 2025

(51) Int. Cl.
*G06T 7/00* (2017.01)
*G02B 27/64* (2006.01)
*G06T 7/246* (2017.01)

(52) U.S. Cl.
CPC .......... *G06T 7/0004* (2013.01); *G02B 27/642* (2013.01); *G06T 7/248* (2017.01);
(Continued)

(58) Field of Classification Search
CPC . G06T 7/0002–001; G06T 2207/30164; G06T 7/20; G06T 7/246; G06T 7/248; G06T 2207/10016; G02B 27/642
See application file for complete search history.

(56) References Cited

U.S. PATENT DOCUMENTS

2005/0270519 A1* 12/2005 Twerdochlib ........... G01P 3/488
356/24
2014/0267693 A1* 9/2014 Newman ................ H04N 23/23
348/128
(Continued)

FOREIGN PATENT DOCUMENTS

CN    113163076 A  *  7/2021  ........... H04N 23/687
JP    S61-296302 A     12/1986
(Continued)

OTHER PUBLICATIONS

Wollmann, Tino, et al. "Motion blur suppression by using an optical derotator for deformation measurement of rotating components." Nondestructive Characterization and Monitoring of Advanced Materials, Aerospace, Civil Infrastructure, and Transportation XIV. vol. 11380. SPIE, 2020. (Year: 2020).*
(Continued)

*Primary Examiner* — Geoffrey E Summers
(74) *Attorney, Agent, or Firm* — Sughrue Mion, PLLC

(57) ABSTRACT

A state determination apparatus acquires each of time-series fixed images obtained by shooting a rotating object via a first optical device that rotates and emits incident light; calculates a displacement amount of a plurality of specific points on the object, and calculates a difference between the displacement amount of a reference specific point and the displacement amount of each specific point other than the reference specific point; calculates, as an out-of-plane displacement, a displacement of a surface of the object on an image plane following movement of the object in a normal direction of the image plane, using the difference; calculates, as an in-plane displacement, a displacement of the surface of the object on the image plane following movement of the surface of the object; and specifies an abnormality of the
(Continued)

object, based on a distribution of the in-plane displacement or a temporal change of the out-of-plane displacement.

15 Claims, 26 Drawing Sheets

(52) U.S. Cl.
CPC .............. *G06T 2207/10016* (2013.01); *G06T 2207/30164* (2013.01)

(56) References Cited

U.S. PATENT DOCUMENTS

| | | | |
|---|---|---|---|
| 2016/0063350 A1 | 3/2016 | Newman | |
| 2018/0106609 A1* | 4/2018 | Imai ....................... | G01N 21/88 |
| 2019/0095765 A1 | 3/2019 | Lim et al. | |

FOREIGN PATENT DOCUMENTS

| | | |
|---|---|---|
| JP | H02-115706 A | 4/1990 |
| JP | H06-148087 A | 5/1994 |
| JP | H08-94534 A | 4/1996 |
| JP | H10-260359 A | 9/1998 |
| WO | 2016/152075 A1 | 9/2016 |
| WO | 2016/152076 A1 | 9/2016 |
| WO | 2019/053773 A1 | 3/2019 |
| WO | 2021/111533 A1 | 6/2021 |

OTHER PUBLICATIONS

Boden, Fritz, Bolesław Stasicki, and Krzysztof Ludwikowski. "Optical rotor-blade deformation measurements using a rotating camera." 38th European Test and Telemetry Conference. 2018. (Year: 2018).*

Fagan, W. F., and P. Waddell. "Industrial applications of image derotation." Industrial Applications of Laser Technology. vol. 398. SPIE, 1983. (Year: 1983).*

Miyashita, Leo, Yoshihiro Watanabe, and Masatoshi Ishikawa. "High-speed image rotator for blur-canceling roll camera." 2015 IEEE/RSJ International Conference on Intelligent Robots and Systems (IROS). IEEE, 2015. (Year: 2015).*

Reithmeier, Eduard, Sahar Mirzaei, and Natallia Kasyanenko. "Optical vibration and deviation measurement of rotating machine parts." Optoelectronics Letters 4.1 (2008): 45-48. (Year: 2008).*

English translation of Written opinion for PCT Application No. PCT/JP2021/029402, mailed on Oct. 26, 2021.

International Search Report for PCT Application No. PCT/JP2021/029402, mailed on Oct. 26, 2021.

Lee, Hyoseong, et al., "Measurement of 3-D vibration by dynamic photogrammetry using least-square image matching for sub-pixel targeting." Sensors, 2015 IEEE. IEEE, 2015.

J Winstroth, Jan, and Jorg Seume, "Wind turbine rotor blade monitoring using digital image correlation: Assessment on a scaled model." 32nd ASME Wind Energy Symposium. 2014.

JP Office Action for JP Application No. 2023-539568, mailed on Dec. 2, 2025 with English Translation.

* cited by examiner $\longrightarrow$  OUT-OF-PLANE DISPLACEMENT VECTORS
$(\delta_{xi}, \delta_{yi})$ $\longrightarrow$  IN-PLANE DISPLACEMENT VECTORS
$(\Delta_{xi}, \Delta_{yi})$ $-\!-\!\rightarrow$  MEASUREMENT VECTOR$(V_{xi}, V_{yi})$

VIBRATION DIRECTION

20A

21

PRIMARY VIBRATION MODE

SECONDARY MODE

TERTIARY MODE

OUT-OF-PLANE DISPLACEMENTS

FREQUENCIES

STATE DETERMINATION APPARATUS, STATE DETERMINATION METHOD, AND COMPUTER-READABLE RECORDING MEDIUM

This application is a National Stage Entry of PCT/JP2021/029402 filed on Aug. 6, 2021, the contents of all of which are incorporated herein by reference, in their entirety.

TECHNICAL FIELD

The present invention relates to a state determination apparatus and a state determination method for determining the state of an object, and, furthermore, to a computer-readable recording medium including a program recorded thereon for realizing the apparatus and method.

BACKGROUND ART

When defects such as surface cracks, peeling and internal cavities occur in objects that perform motion such as movement and rotation, like wind power propellers, turbine blades and the wheels of moving vehicles, the integrity of structures containing the objects can be adversely affected. These defects thus need to be accurately detected as abnormalities as soon as possible.

One object inspection technique involves detecting abnormalities of an object by stopping the motion of the object and having an inspector carry out an visual inspection or a hammering test. Problems with this technique include the considerable labor costs and not being able to use the structure containing the object during the inspection.

In view of this, a technique has been developed for determining the state of an object based on images of the object, without stopping the motion of the object. For example, with technologies disclosed in Non-Patent Document 1 and Non-Patent Document 2, a moving image of the object is shot with a stereo camera, movement of a plurality of points on the object is obtained from a time-series of frame images constituting the moving image, and abnormalities of the object in motion are detected.

Also, with technologies disclosed in Patent Document 1 and Patent Document 2, a displacement amount on the surface of the object in a direction along the surface (hereinafter also referred to as "in-plane displacement") and a displacement amount in a direction along the optical axis of the camera (hereinafter also referred to as "out-of-plane displacement") are detected from a moving image shot using a single camera rather than a stereo camera. Furthermore, in the technologies disclosed in Patent Document 1 and Patent Document 2, defects (abnormalities) of the object such as cracks, peeling and internal cavities are detected, based on the detected out-of-plane displacement and in-plane displacement.

LIST OF RELATED ART DOCUMENTS

Patent Document

Patent Document 1: International Patent Publication No. WO 2016/152075
Patent Document 2: International Patent Publication No. WO 2016/152076

Non-Patent Document

Non-Patent Document 1: Lee, Hyoseong, et al. "Measurement of 3-D vibration by dynamic photogrammetry using least-square image matching for sub-pixel targeting." SENSORS, 2015 IEEE. IEEE, 2015.
Non-Patent Document 2: Winstroth, Jan, and Jorg Seume. "Wind turbine rotor blade monitoring using digital image correlation: Assessment on a scaled model." 32nd ASME Wind Energy Symposium. 2014.

SUMMARY OF INVENTION

Problems to be Solved by the Invention

With the technologies disclosed in Non-Patent Document 1 and Non-Patent Document 2, there is a problem in that the moving image needs to be shot using a stereo camera, and the size of the apparatus increases due to the size of the stereo camera. On the other hand, with the technologies disclosed in Patent Document 1 and Patent Document 2, a single camera is used, and an increase in size can be suppressed more than with a stereo camera, thus avoiding the problem of the increased size of the apparatus due to the stereo camera.

However, with the technologies disclosed in Patent Document 1 and Patent Document 2, even if the out-of-plane displacement and the in-plane displacement of the object in motion are measured, displacement due to vibration (noise) associated with the motion of the object is added to both the out-of-plane displacement and the in-plane displacement, thus making it difficult to obtain accurate measurement values. It thus becomes difficult to capture characteristics appearing in the out-of-plane displacement and the in-plane displacement that are caused by abnormalities of the object from the measurement values, resulting in a deterioration in the detection accuracy of abnormalities of the object.

Also, at the time of shooting moving images of the object, motion blur (moving image blur) occurs in the obtained images. Thus, with the technologies disclosed in Patent Document 1 and Patent Document 2, the displacement measurement accuracy deteriorates due to motion blur, and the detection accuracy of abnormalities of the object thereby deteriorates.

An example object of the present disclosure, as one example aspect, is to provide a state determination apparatus, a state determination method and a computer-readable recording medium for accurately detecting abnormalities of a rotating object while suppressing an increase in apparatus size.

Means for Solving the Problems

In order to achieve the above-described object, a state determination apparatus includes:

a fixed image acquisition unit that acquires, as a fixed image, each of time-series images obtained by continuously shooting a rotating object with an image capturing apparatus via a first optical device that rotates and emits incident light;

a difference calculation unit that calculates a displacement amount of a plurality of specific points on the object, using each of the acquired fixed images, and, with one of the plurality of specific points as a reference specific point, calculates a difference between the displacement amount of the reference specific point and the displacement amount of each specific point other than the reference specific point;

an out-of-plane displacement calculation unit that calculates, as an out-of-plane displacement, a displacement of a surface of the object on an image plane of the image capturing apparatus following movement of the object in a normal direction of the image plane, using the difference;

an in-plane displacement calculation unit that calculates, as an in-plane displacement, a displacement of the surface of the object on the image plane following movement of the surface of the object in a direction along the surface, using the difference and the out-of-plane displacement; and an abnormality determination unit that specifies an abnormality of the object, based on a distribution of the in-plane displacement or a temporal change of the out-of-plane displacement.

In order to achieve the above-described object, a posture estimation method includes:

a step of acquiring, as a fixed image, each of time-series images obtained by continuously shooting a rotating object with an image capturing apparatus via a first optical device that rotates and emits incident light;

a step of calculating a displacement amount of a plurality of specific points on the object, using each of the acquired fixed images, and, with one of the plurality of specific points as a reference specific point, calculating a difference between the displacement amount of the reference specific point and the displacement amount of each specific point other than the reference specific point;

a step of calculating, as an out-of-plane displacement, a displacement of a surface of the object on an image plane of the image capturing apparatus following movement of the object in a normal direction of the image plane, using the difference;

a step of calculating, as an in-plane displacement, a displacement of the surface of the object on the image plane following movement of the surface of the object in a direction along the surface, using the difference and the out-of-plane displacement; and a step of specifying an abnormality of the object, based on a distribution of the in-plane displacement or a temporal change of the out-of-plane displacement.

In order to achieve the above-described object, a computer readable recording medium according to an example aspect of the invention is a computer readable recording medium that includes recorded thereon a program, the program including instructions that cause the computer to carry out:

a step of acquiring, as a fixed image, each of time-series images obtained by continuously shooting a rotating object with an image capturing apparatus via a first optical device that rotates and emits incident light;

a step of calculating a displacement amount of a plurality of specific points on the object, using each of the acquired fixed images, and, with one of the plurality of specific points as a reference specific point, calculating a difference between the displacement amount of the reference specific point and the displacement amount of each specific point other than the reference specific point;

a step of calculating, as an out-of-plane displacement, a displacement of a surface of the object on an image plane of the image capturing apparatus following movement of the object in a normal direction of the image plane, using the difference;

a step of calculating, as an in-plane displacement, a displacement of the surface of the object on the image plane following movement of the surface of the object in a direction along the surface, using the difference and the out-of-plane displacement; and a step of specifying an abnormality of the object, based on a distribution of the in-plane displacement or a temporal change of the out-of-plane displacement.

Advantageous Effects of the Invention

As described above, according to the invention, it is possible to accurately detect abnormalities of a rotating object while suppressing an increase in apparatus size.

EXAMPLE EMBODIMENTS

First Example Embodiment

Hereinafter, a state determination apparatus in a first example embodiment will be described with reference to the drawings.

[Apparatus Configuration]

Figure 1:
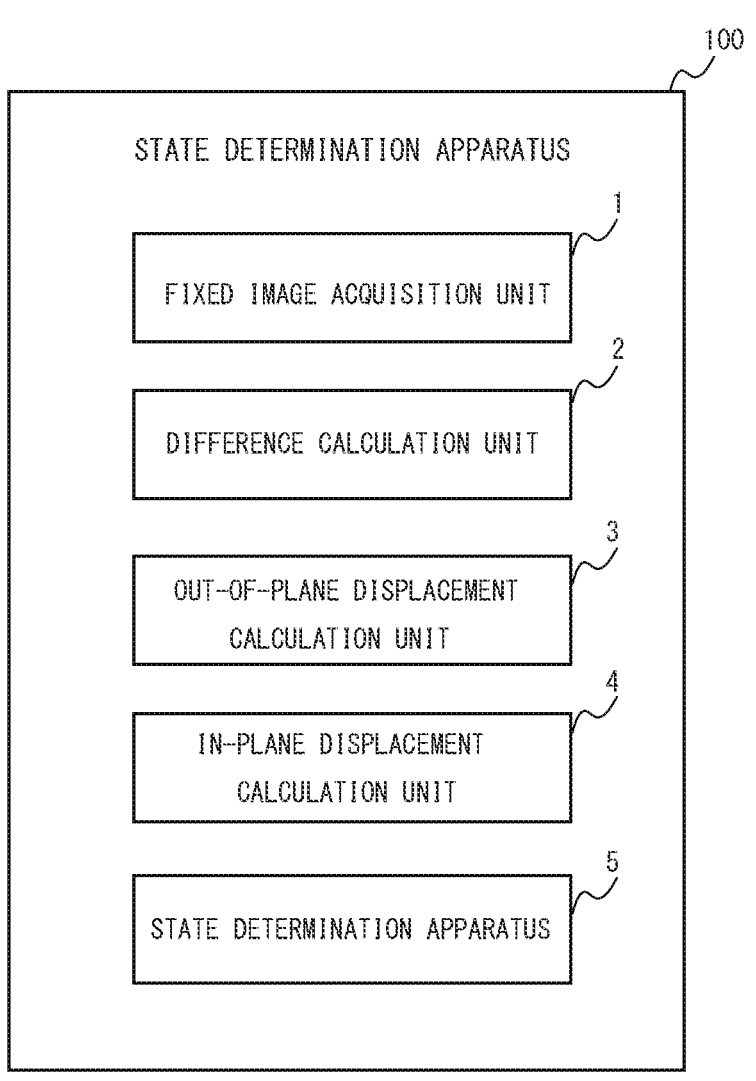
FIG. 1 is a block diagram for describing a schematic configuration of a state determination apparatus in first example embodiment.

Initially, a schematic configuration of the state determination apparatus in the first example embodiment will be described using FIG. 1. FIG. 1 is a block diagram for describing a schematic configuration of the state determination apparatus in the first example embodiment.

A state determination apparatus 100 is an apparatus that detects displacement of the surface of an object from time-series images obtained by capturing images of the object, and determines abnormalities of the object. The state determination apparatus 100 includes a fixed image acquisition unit 1, a difference calculation unit 2, an out-of-plane displacement calculation unit 3, an in-plane displacement calculation unit 4, and an abnormality determination unit 5.

The fixed image acquisition unit 1 acquires, as a fixed image, each of the time-series images obtained by continuously shooting a rotating object with an image capturing apparatus, via an optical device that rotates and emits incident light.

The difference calculation unit 2 calculates the displacement amounts of a plurality of specific points on the object, using the acquired fixed images, and, with one of the specific points as a reference specific point, calculates the difference between the displacement amount of the reference specific point and the displacement amount of each specific point other than the reference specific point.

The out-of-plane displacement calculation unit 3 calculates, as the out-of-plane displacement, displacement of the surface of the object on an image plane of the image capturing apparatus following movement of the object in the normal direction of the image plane, using the difference.

The in-plane displacement calculation unit 4 calculates, as the in-plane displacement, displacement of the surface of the object on the image plane following movement of the surface of the object in the direction along the surface, using the difference and the out-of-plane displacement.

The abnormality determination unit 5 specifies abnormalities of the object, based on the distribution of the in-plane displacement or the temporal change in the out-of-plane displacement.

According to the above state determination apparatus 100, abnormalities of the object are determined with only one image capturing apparatus, without needing a stereo camera as required with the technologies disclosed in Non-Patent Document 1 and Non-Patent Document 2, thus enabling an increase in apparatus size to be suppressed. Also, by suppressing error caused by excess vibration (noise) that occurs in the rotating object, abnormalities of the rotating object can be accurately detected.

Figure 2:
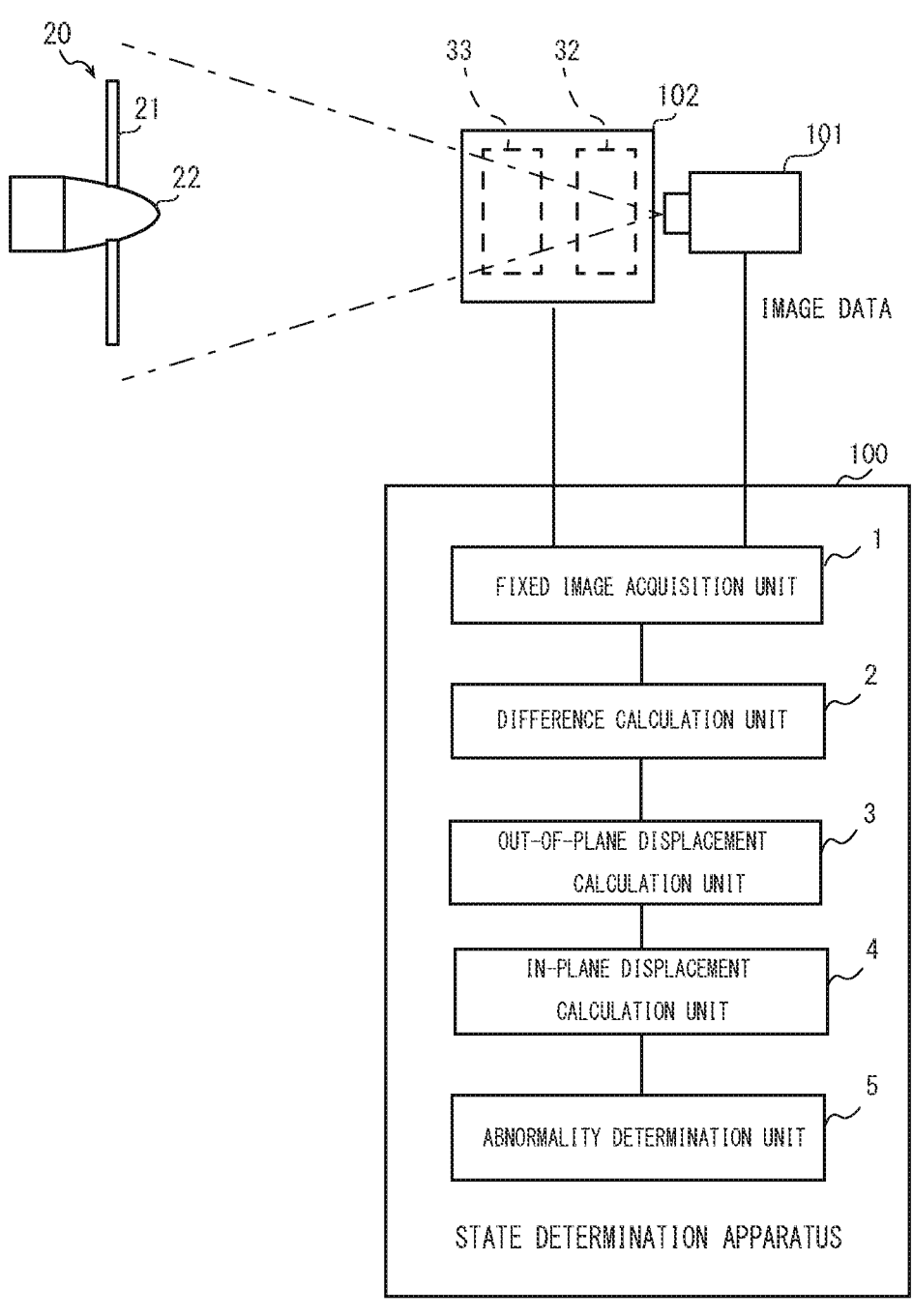
FIG. 2 is a block diagram for describing an example of a specific configuration of the state determination apparatus of the first example embodiment.

Next, the configuration and function of the state determination apparatus according to the first example embodiment will be specifically described. FIG. 2 is a block diagram for describing an example of the specific configuration of the state determination apparatus 100 of the first example embodiment.

An image capturing apparatus 101 for shooting images of an object 20 targeted for state determination is connected to the state determination apparatus 100. The image capturing apparatus 101 is provided with a solid-state image sensor such as a CCD (Charge Coupled Device) or a CMOS (Complementary Metal-Oxide-Semiconductor), for example. In the first example embodiment, the object 20 is a moving object that performs rotational motion, such as a wind power propeller or a turbine. The state determination apparatus 100, in particular, performs state determination for a portion of the propeller or the blade of the turbine. In the example in FIG. 2, the object 20 is a propeller. The object 20 is constituted by blades 21 and a spinner 22.

In the first example embodiment, the image capturing apparatus 101 is provided with a function of continuously outputting image data at a set interval, and generates images constituted by consecutive frames along a time series (here-inafter referred to as "time-series images"). In the first example embodiment, the framerate of the time-series images is set as appropriate with consideration for the natural frequency of the object 20, and is set to 400 fps (frames per second), for example. The image capturing apparatus 101 outputs the image data of the time-series images to the state determination apparatus 100 in units of frames.

Also, as illustrated in FIG. 2, in the first example embodi-ment, an optical device 102 is disposed between the image capturing apparatus 101 and the object 20 targeted for image capture. The optical device 102 includes rotary optical systems 32 and 33 for rotating and emitting incident light.

Figure 3:
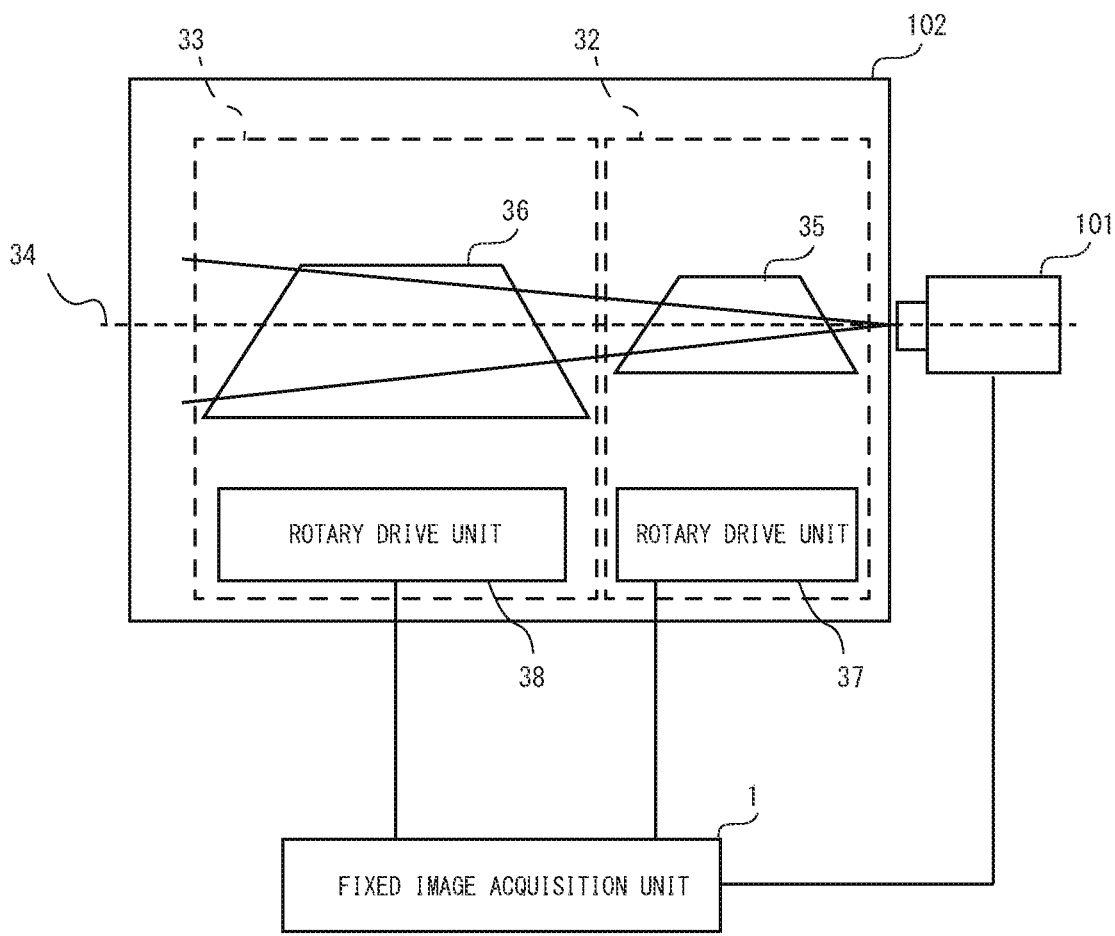
FIG. 3 is a block diagram illustrating an example of an optical device that is used in the first example embodiment.

The configuration of the optical device 102 will now be specifically described using FIG. 3. FIG. 3 is a block diagram illustrating an example of the optical device that is used in the first example embodiment.

As illustrated in FIG. 3, the rotary optical system 32 is provided with a hollow motor (not illustrated), a dove prism 35, and a rotary drive unit 37. The dove prism 35 is held inside the hollow motor. The rotary drive unit 37 drives the hollow motor. In the rotary optical system 32, the dove prism 35 rotates when the rotary drive unit 37 drives the hollow motor.

As illustrated in FIG. 3, the rotary optical system 33 is also similarly provided with a hollow motor (not illustrated), a dove prism 36 and a rotary drive unit 38. The dove prism 36 is also similarly held inside the hollow motor. In the rotary optical system 33, the dove prism 36 also similarly rotates when the rotary drive unit 38 drives the hollow motor.

Also, as illustrated in FIG. 3, the rotary optical systems 32 and 33 are disposed in series along an optical axis (axis passing through the center of the image plane) 34 of the image capturing apparatus 101. Specifically, the rotary opti-cal systems 32 and 33 are disposed such that the dove prisms 35 and 36 are located on the optical axis 34. The dove prisms 35 and 36 rotate about the optical axis 34.

Since the dove prisms 35 and 36 both rotate about the optical axis 34, incident images are rotated about the optical axis 34. The image capturing apparatus 101 thus captures images of the object 20 through the dove prisms 35 and 36 which rotate at a rotation speed that corresponds to the rotation speed of the object 20, and as a result, images in which the rotation of the object 20 is cancelled out can be captured.

Also, the dove prisms 35 and 36 are able to optically rotate incident images at a speed twice the rotation speed (number of rotations) thereof. Accordingly, when the dove prism 35 and the dove prism 36 are rotated in opposite directions to each other, the rotation speed of the images exiting the dove prism 36 after entering through the dove prism 35 will be the sum of twice the respective rotation speeds of the dove prisms 35 and 36. For example, when the dove prism 35 and the dove prism 36 are rotated in opposite directions to each other at the same rotation speed, the rotation speed of the images will be four times the rotation speed of the dove prisms 35 and 36.

Assume, for example, that the cross-sectional size of the dove prism 35 (cross-section perpendicular to the optical axis 34) is 10 mm×10 mm, and the cross-sectional size of the dove prism 36 is 20 mm×20 mm. Also, assume that the rotation speed of the dove prism 35 is controlled to be in the range of 0 rpm to 4800 rpm, and the rotation speed of the dove prism 36 is controlled to be between 0 rpm and 2400 rpm. Then, when the dove prism 35 is rotated at 4800 rpm and the dove prism 36 is rotated at 2400 rpm, images that have passed through the two dove prisms 35 and 36 rotate at 14400 rpm (=4800 rpm×2+2400 rpm×2), which is the sum of twice the respective rotation speeds. In other words, in this case, the rotation speed of images that have passed through the dove prisms 35 and 36 is controlled to be between 0 rpm to 14400 rpm.

In the first example embodiment, the size of the dove prisms 35 and 36 is determined according to the angle of view of the image capturing lens of the image capturing apparatus 101. For example, the angle of view of the image capturing lens increases as the distance between the image capturing apparatus 101 and the dove prisms 35 and 36 increases, and thus the dove prisms 35 and 36 are set to be large in size.

Note that three or more dove prisms may be used. For example, when a prism with a cross-sectional size of 5 mm×5 mm is rotated at a rotation speed of 7200 rpm, a prism with a cross-sectional size of 10 mm×10 mm is rotated at a rotation speed of 4800 rpm, and a prism with a cross-sectional size of 20 mm×20 mm is rotated at a rotation speed of 1800 rpm, images that have passed through the three dove prisms rotate at a rotation speed of 27600 rpm (=7200 rpm×2+4800 rpm×2+1800 rpm×2). In this case, the rotation speed of the images is controlled to be from 0 rpm to 27600 rpm.

In this way, in the case where a plurality of dove prisms are used, a high image rotation speed is obtained with a smaller driving force compared to a single dove prism, and appropriate response control that depends on the movement (rotation) of the object 20 becomes possible. Note that, in the first example embodiment, the rotation speed of each dove prism is determined by the fixed image acquisition unit 1, as will be described later.

Figure 4A:
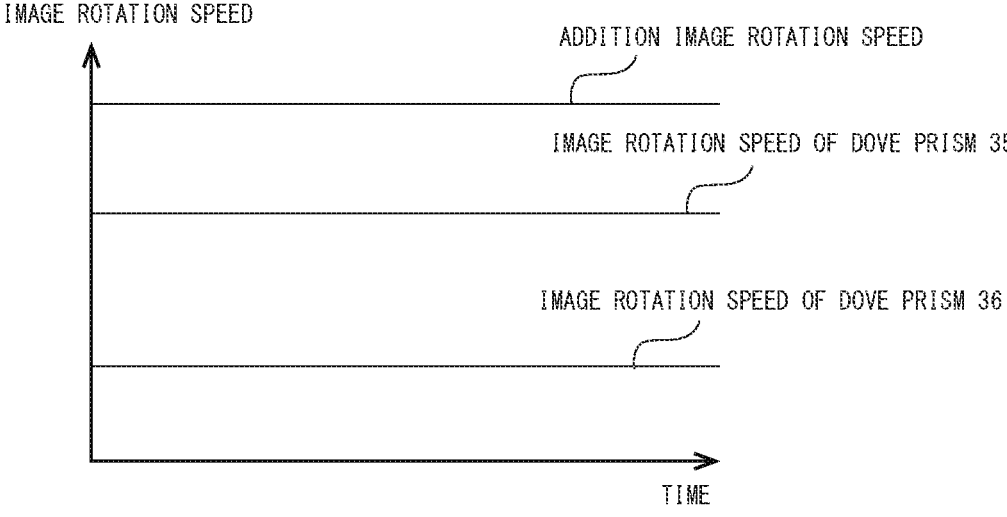
FIG. 4A is a diagram illustrating a relationship between image rotation speeds of dove prisms and an addition image rotation speed, in case where a rotation speed of an object is constant.
Figure 4B:
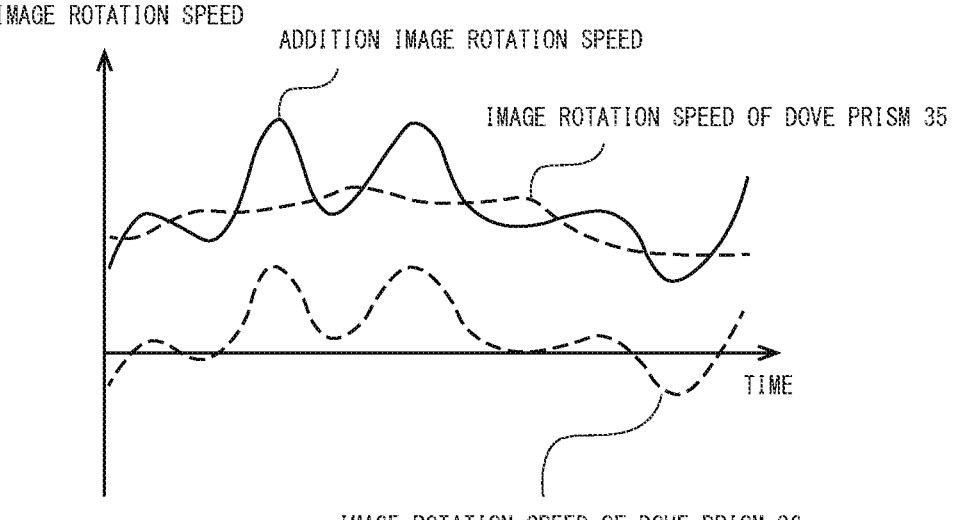
FIG. 4B is a diagram illustrating a relationship between image rotation speeds of dove prisms and an addition image rotation speed, in case where a rotation speed of the object is variable.

FIG. 4A is a diagram illustrating the relationship between the image rotation speeds of the dove prisms 35 and 36 and an addition image rotation speed, in the case where the rotation speed of the object is constant. FIG. 4B is a diagram illustrating the relationship between the image rotation speeds of the dove prisms 35 and 36 and the addition image rotation speed, in the case where the rotation speed of the object is variable. The image rotation speeds of the dove prisms 35 and 36 are the rotation speeds of images respec-tively rotated by the dove prisms 35 and 36. The addition image rotation speed is the rotation speed of the images rotated by the two dove prisms 35 and 36. When the rotation speed of the object 20 is constant, the relationship between the image rotation speed of the dove prism 36 rotating at a lower speed, the image rotation speed of the dove prism 35 rotating at a higher speed, and the addition image rotation speed of the dove prisms 35 and 36 is constant over time as illustrated in FIG. 4A. On the other hand, when the rotation speed of the object 20 is variable, the relationship described above changes over time as illustrated in FIG. 4B.

Figure 5:
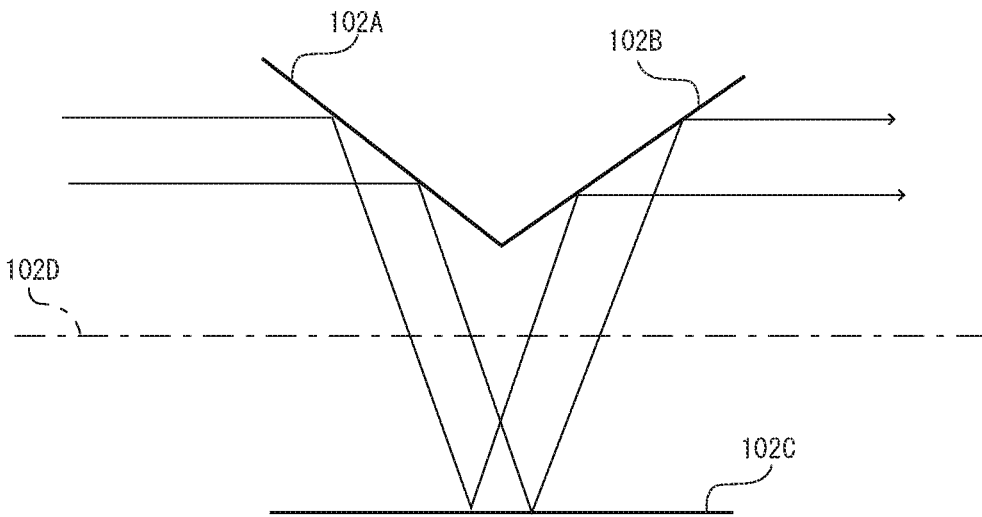
FIG. 5 is a diagram illustrating another example of the optical device.

Note that, in the first example embodiment, the optical device 102 is not limited to the configuration provided with the dove prisms 35 and 36. For example, the optical device 102 may be an image rotator constituted by three mirrors 102A, 102B and 102C that rotate about an axis 102D, as illustrated in FIG. 5. FIG. 5 is a diagram illustrating another example of the optical device 102.

Next, the units illustrated in FIG. 2 that are included in the state determination apparatus 100 of the first example embodiment will be described.

In the first example embodiment, the fixed image acquisition unit 1 is able to cause the image capturing apparatus 101 to shoot images of the object 20 in a state where the dove prisms of the optical device 102 are not rotated. In this case, the fixed image acquisition unit 1 acquires image data of time-series images captured by the image capturing apparatus 101, and derives the rotation speed and rotation direction of the rotating object 20, based on the difference between the frames of the acquired time-series images.

Figure 6A:
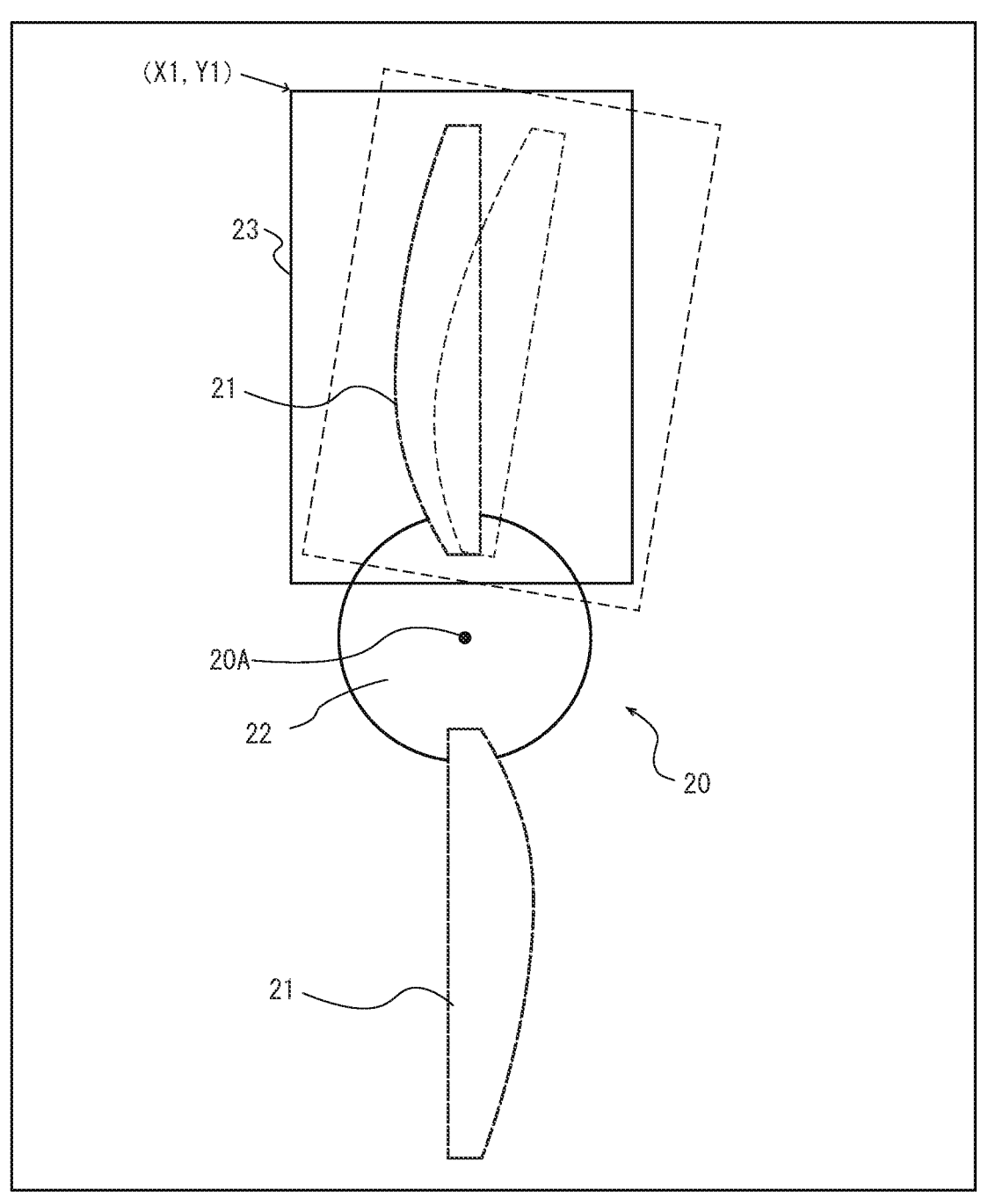
FIG. 6A is a diagram for describing processing for deriving the rotation speed and rotation direction of the object by a fixed image acquisition unit, and illustrates a specific frame of time-series images of the object.
Figure 6B:
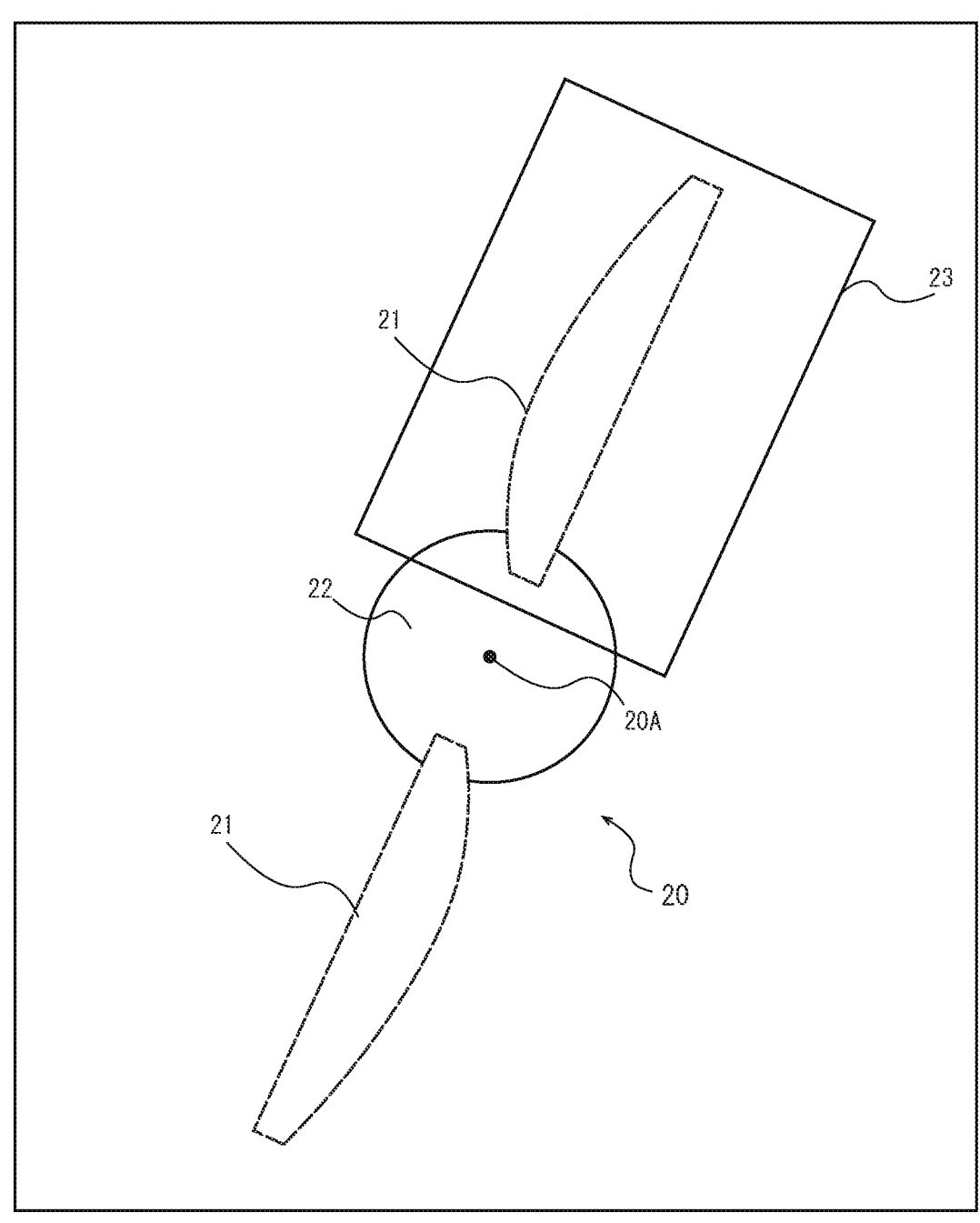
FIG. 6B is a diagram for describing processing for deriving the rotation speed and rotation direction of the object by the fixed image acquisition unit, and illustrates next frame of the frames illustrated in FIG. 6A.

FIG. 6A is a diagram for describing the processing for deriving the rotation speed and rotation direction of an object by the fixed image acquisition unit 1, and shows a specific frame of the time-series images of the object 20. FIG. 6B is a diagram for describing the processing for deriving the rotation speed and rotation direction of an object by the fixed image acquisition unit 1, and illustrates the next frame of the frames illustrated in FIG. 6A.

The object 20 is a propeller that rotates about a rotation axis 20A, and has two blades 21 and a spinner 22. Note that the number of blades of the object 20 is not particularly limited. The fixed image acquisition unit 1 first executes known object detection processing (e.g., pattern matching), using frame images of the time-series images of the object 20 illustrated in FIG. 6A. The fixed image acquisition unit 1 thereby detects a blade 21 of the object 20 and sets a rectangular selection region 23 that surrounds the detected blade 21. At this time, assume that the upper left coordinates of the selection region 23 are set to (X1, Y1). Note that detection of a plurality of blades 21 may be performed at the same time. In this case, the selection region 23 is set for each blade 21.

The dashed line in FIG. 6A shows a state in which the selected region 23 in FIG. 6A is rotated by an angle θ about the rotation axis 20A. The fixed image acquisition unit 1 rotates the selected region 23 about the rotation axis 20A from 0 degrees to 360 degrees in increments of the angle θ, which is 1 degree, for example, and generates a plurality of images having different rotation angles. The fixed image acquisition unit 1 then executes an image correlation computation with the image of the next frame illustrated in FIG. 6B, for each image of the state where the selected region 23 is rotated, and specifies an angle θ' at which a correlation value (similarity of images) is at a maximum.

Here, an affine transformation can be used as an image processing method for rotating images. The angle at which the selected region 23 is rotated in one rotation is set to 1 degree in the above example, but the first example embodiment is not particularly limited thereto. The angle at which the selected region 23 is rotated in one rotation is set as appropriate according to the required accuracy or the calculation cost. Note that various image processing methods other than an image correlation computation may be used in order to evaluate the similarity of images. Furthermore, rotation of images may be performed using various types of image interpolation processing. Also, a configuration may be adopted in which the processing method used to evaluate the similarity of images and the image processing method used to rotate the images can be selected from various methods according to the calculation cost.

Upon the fixed image acquisition unit 1 specifying the angle θ', the rotation speed (number of rotations) of the blades 21 of the object 20 is calculated, using the angle θ' and the framerate. The fixed image acquisition unit 1 determines the rotation speed of each of the dove prisms 35 and

Figure 7:
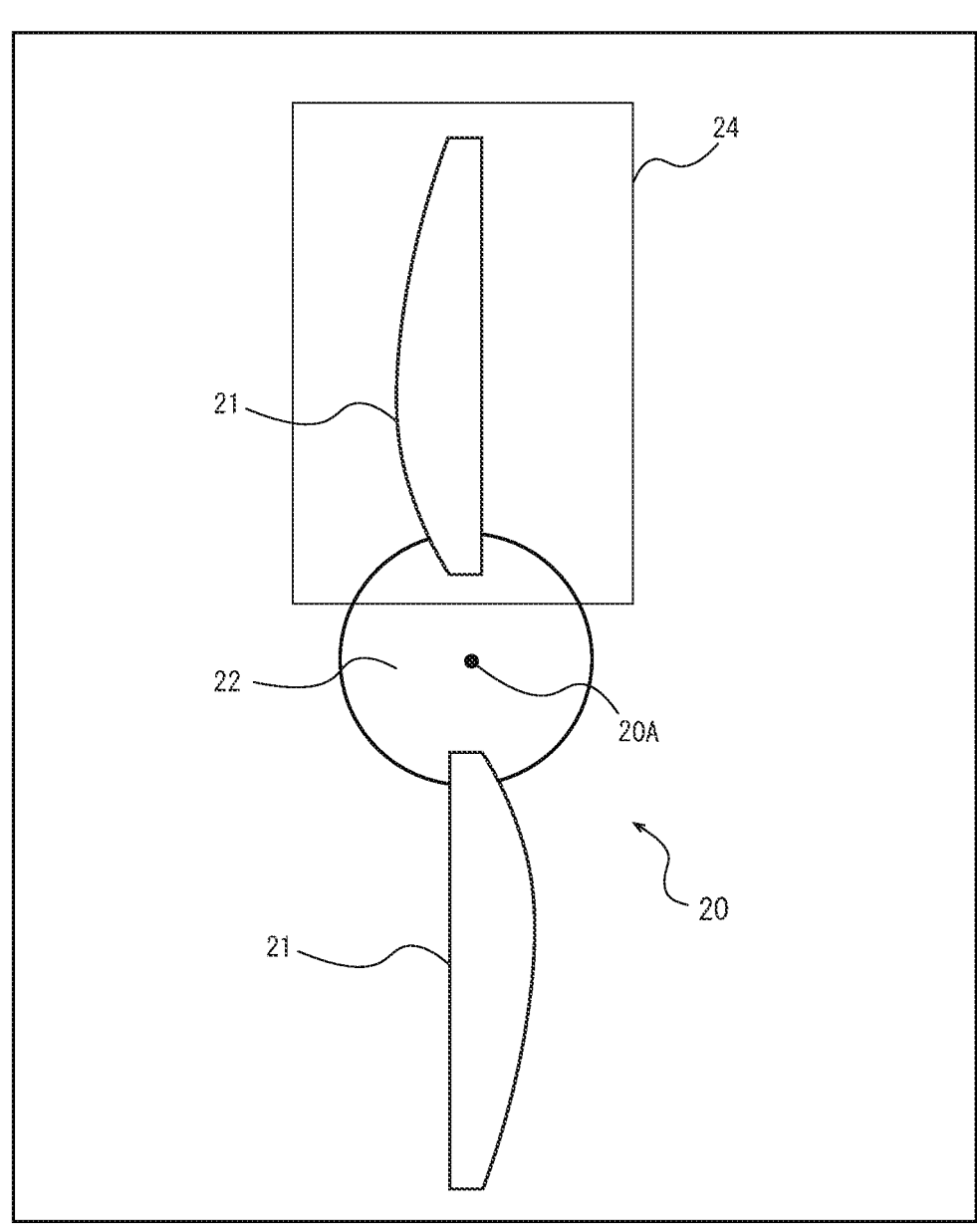
FIG. 7 is a diagram illustrating an image captured by the image capturing apparatus via the rotating dove prisms.

36, such that the addition rotation speed matches the calculated rotation speed of the object 20. The fixed image acquisition unit 1 then instructs the determined rotation speeds to the rotary drive units 37 and 38, and rotates the dove prisms 35 and 36 in opposite directions to each other at the determined rotation speeds with the rotary drive units 37 and 38. The image capturing apparatus 101 thereby captures an image of the object 20 through the rotating dove prisms 35 and 36. As a result, as illustrated in FIG. 7, the image capturing apparatus 101 captures an image in which rotation blur (motion blur) of the blade 21 of the object 20 is canceled out. FIG. 7 is a diagram illustrating an image captured by the image capturing apparatus 101 via the rotating dove prisms 35 and 36.

The fixed image acquisition unit 1 detects the blade 21 of the object 20 in the captured image illustrated in FIG. 7, and sets a rectangular selection region 24 that surrounds the detected blade 21. The upper left coordinates of the selection region 24 are also set to (X1, Y1), similarly to the selection region 23 described above. In this case, detection of a plurality of blades 21 may also similarly be performed at the same time, in which case the selection region 24 is set for each blade 21. In the first example embodiment, the image illustrated in FIG. 7 in which rotation blur is canceled out is referred to as a "fixed image". The fixed image acquisition unit 1 acquires a time series of fixed images in which rotation blur is suppressed, by repeating the processing described above for each frame image, and sets the selection region 24 for each fixed image.

Figure 8:
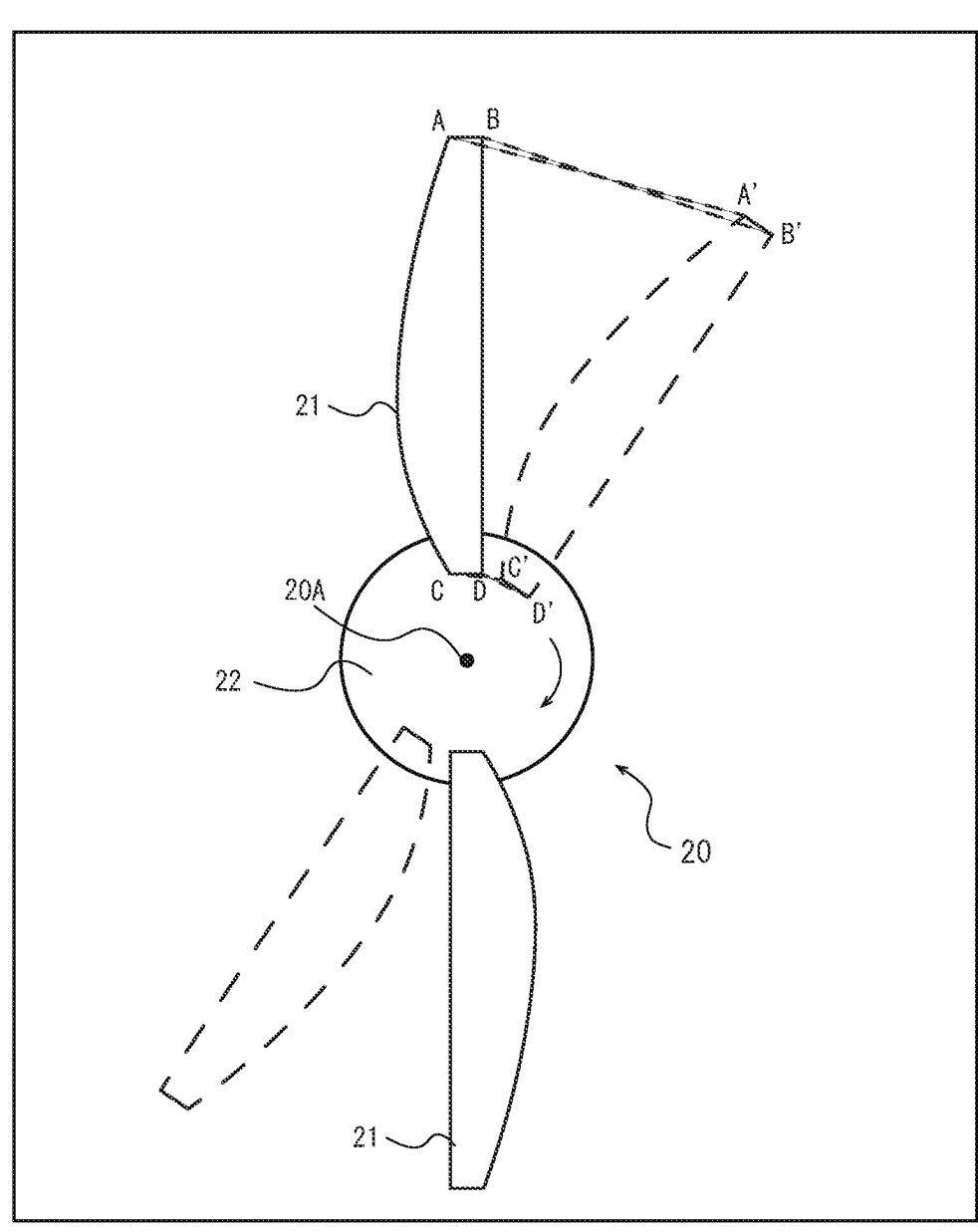
FIG. 8 is a diagram illustrating an example of a time-series of fixed images in case where no excess vibration occurs in the object.
Figure 9:
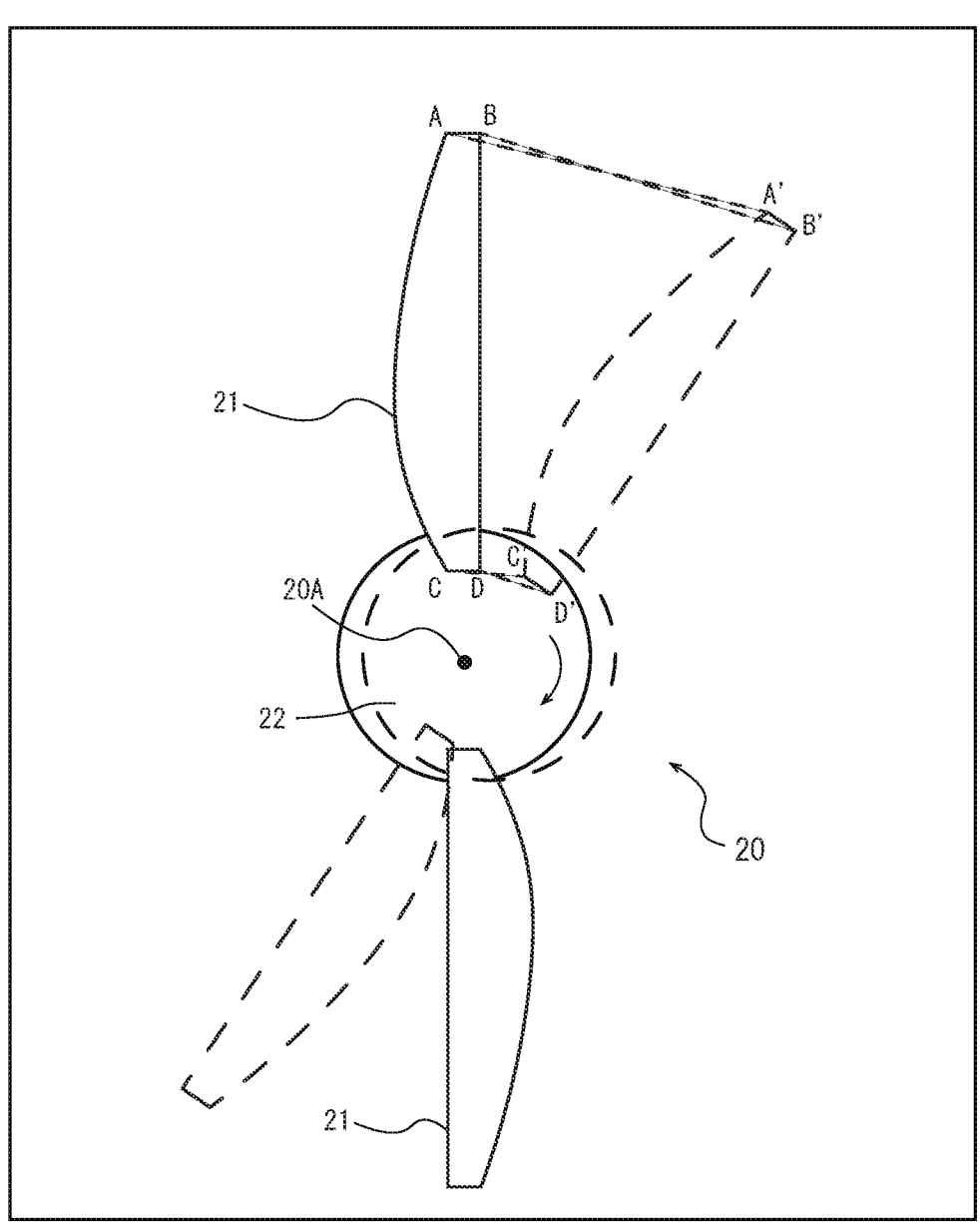
FIG. 9 is a diagram illustrating an example of a time-series of fixed images in case where excess vibration occurs in the object.

As described above, the difference calculation unit 2 calculates the displacement amount of a plurality of specific points on the object 20, using the time-series fixed images generated by the fixed image acquisition unit 1. The displacement amount calculation processing by the difference calculation unit 2 will now be described using FIGS. 8 and 9. FIG. 8 is a diagram illustrating an example of a time-series of fixed images in the case where no excess vibration occurs in the object. FIG. 9 is a diagram illustrating an example of a time-series of fixed images in the case where excess vibration occurs in the object.

In FIGS. 8 and 9, the solid line indicates the outer edge of the object in the specific frame, and the dashed line indicates the outer edge of the object 20 in the next frame. As illustrated in FIGS. 8 and 9, specific points A, B, C and D on the blade 21 of the object 20 are then displaced by the rotation of the object 20, and move to specific points A', B', C' and D'. If no excess vibration occurs in the object 20, the positions of the specific points A', B', C', and D' will be the same in both FIGS. 8 and 9, but in FIG. 9, excess vibration occurs in the object 20. Thus, the positions of the specific points A', B', C' and D' are different between FIGS. 8 and 9.

Figure 10A:
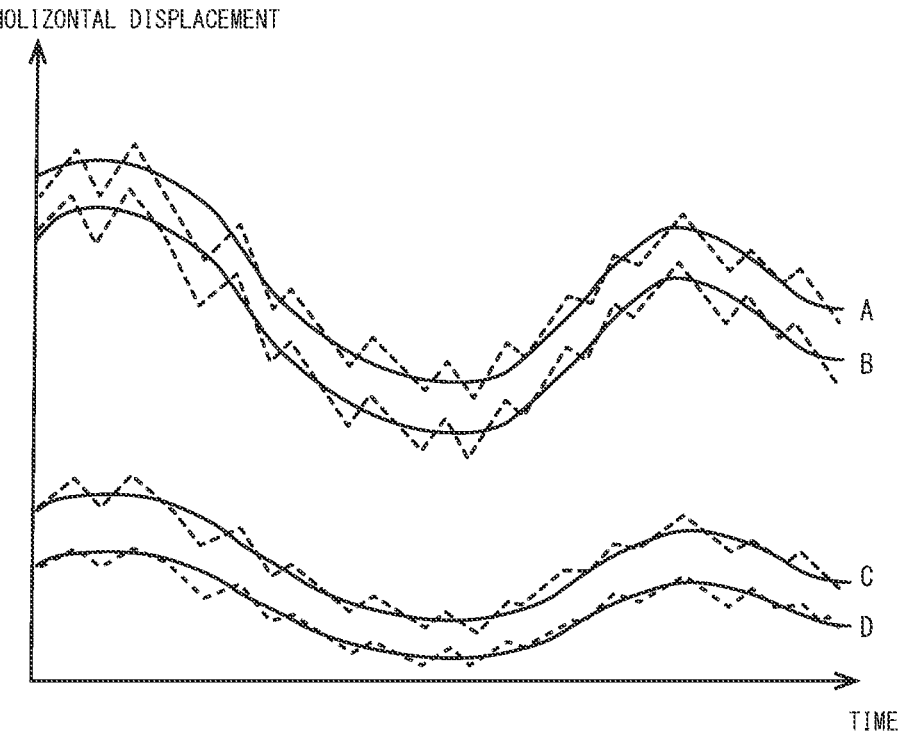
FIG. 10A is a diagram illustrating temporal change in position of each specific point on the object illustrated in FIGS. 8 and 9.
Figure 10B:
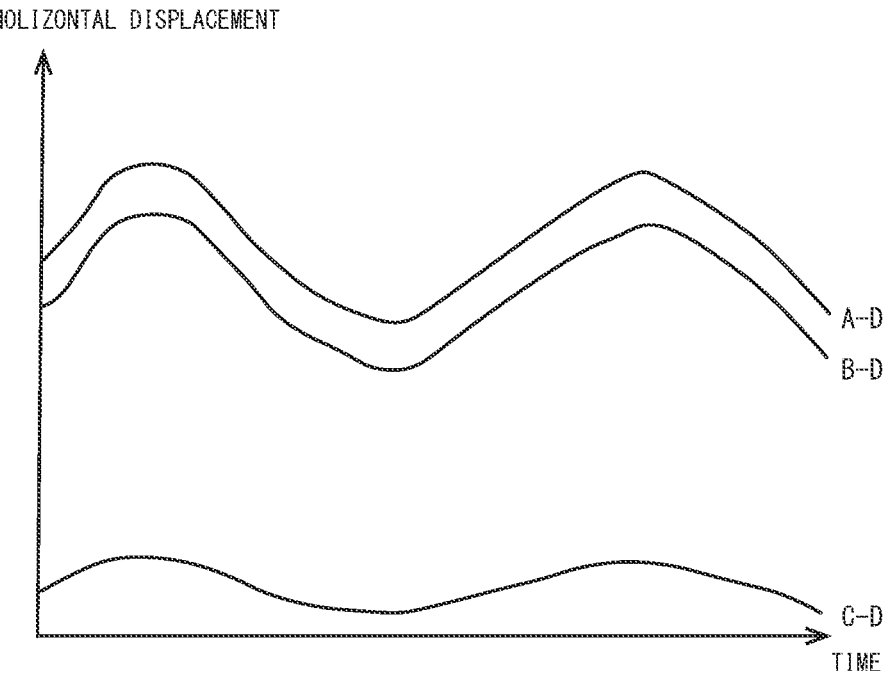
FIG. 10B is a diagram illustrating temporal change in position of each specific point referenced on one of the specific points on the object illustrated in FIGS. 8 and 9.

Here, the temporal change in the positions of the specific points illustrated in FIGS. 8 and 9 will be described, using FIGS. 10A and 10B. FIG. 10A is a diagram illustrating the temporal change in the position of each specific point on the object 20 illustrated in FIGS. 8 and 9. FIG. 10B is a diagram illustrating the temporal change in the position of each specific point referenced on one of the specific points on the object 20 illustrated in FIGS. 8 and 9.

As illustrated in FIG. 10A, in the case where the object 20 is subjected to the excess vibration illustrated in FIG. 9, displacement due to the excess vibration indicated by the dashed line is also added as displacement to the specific points A, B, C and D in the fixed image, in addition to the displacement due to rotation of the object 20 indicated by the solid line (displacement illustrated in FIG. 8).

The difference calculation unit 2 thus takes one of the specific points A to D as a reference specific point (here, specific point D), and calculates the difference between the displacement amount of the specific point D and the displacement amount of each of the specific points A, B, and C. As a result, as illustrated in FIG. 10B, displacement due to excess vibration is removed from the displacement of each specific point in the fixed image illustrated in FIG. 9. FIG. 10B represents the displacement of each specific point referenced on the specific point D. In FIG. 10B, "A–D" indicates the difference between the displacement amount of the specific point D and the displacement amount of the specific point A, "B–D" indicates the difference between the displacement amount of the specific point D and the displacement amount of the specific point B, and "C–D" indicates the difference between the displacement amount of the specific point D and the displacement amount of the specific point C. Also, the displacement amounts of the specific points illustrated in FIG. 10B have similar characteristics to the displacement amounts of specific points A, B, and C when there is no excess vibration as illustrated in FIG. 8.

Also, in the first example embodiment, the out-of-plane displacement calculation unit 3 calculates the out-of-plane displacement of the object as described above. In the first example embodiment, the in-plane displacement calculation unit 4 calculates the in-plane displacement of the object as described above. Here, the out-of-plane displacement calculation processing by the out-of-plane displacement calculation unit 3 and the in-plane displacement calculation processing by the in-plane displacement calculation unit 4 will be specifically described, using FIGS. 11 to 14.

Figure 11:
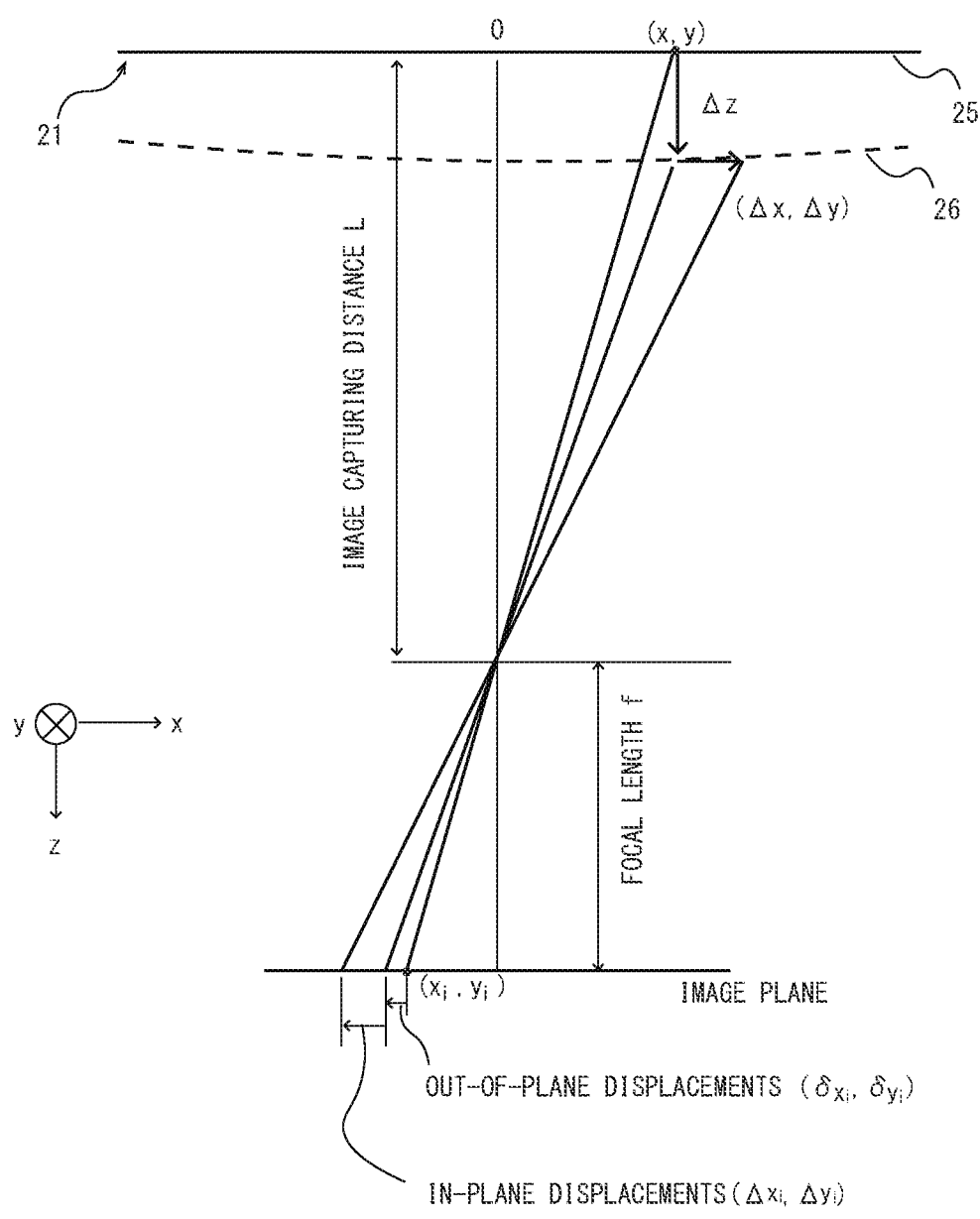
FIG. 11 is a diagram illustrating optical configuration at the time of capturing images of the object.

FIG. 11 is a diagram illustrating the optical configuration at the time of capturing images of the object 20.

In FIG. 11, the surface of the object 20 (in particular, blade 21) that is shot in a specific frame is denoted by reference numeral 25, and the surface of the object 20 that is shot in the next frame is denoted by reference numeral 26. In FIG. 11, the z-axis coincides with the optical axis direction of the image capturing apparatus 101 (normal direction of the image plane), and the x-axis and the y-axis are two axes orthogonal to the optical axis direction and each other, and coincide with the vertical direction and the horizontal direction of a solid-state image capturing apparatus.

Assume, as illustrated in FIG. 11, that the surface 25 thereof moves by $\Delta z$ in the z direction due to the object 20 moving. Also, assume that the image at the coordinates (x, y) on the surface 25 is projected onto coordinates $(x_i, y_i)$ of the image plane. In this case, in the field of view of the image plane of the image capturing apparatus 101, the coordinate $x_i$ on the image plane of the image at the coordinates (x, y) of the surface 25 is displaced by $\delta x_i$ in the x direction. Similarly, the coordinates $y_i$ on the image plane of the image at the coordinates (x, y) of the surface 25 is displaced by $\delta y_i$ in the y direction. $\Delta z$ will be referred to as a depth movement amount, whereas the displacements $\delta x_i$ and $\delta y_i$ on the image plane will hereinafter be referred to as out-of-plane displacements.

Also, as illustrated in FIG. 11, the blade 21 of the object 20 deforms when the surface 25 moves in the z direction by the depth movement amount $\Delta z$, thereby producing surface displacements $\Delta x$ and $\Delta y$ on the surface 26. The displacements $\Delta x_i$ and $\Delta y_i$ projected onto the image plane at this time will hereinafter be referred to as in-plane displacements.

The out-of-plane displacements and the in-plane displacements are respectively represented by Formulas 1 and 2, where f represents the focal length of the lens of the image capturing apparatus 101, and L represents the image capturing distance.

$$\delta x_i = \left(\frac{1}{L-\Delta z} - \frac{1}{L}\right) fx \quad \delta y_i = \left(\frac{1}{L-\Delta z} - \frac{1}{L}\right) fy \qquad \text{[Formula 1]}$$

$$\Delta x_i = \frac{f}{L-\Delta z}\Delta x \quad \Delta y_i = \frac{f}{L-\Delta z}\Delta y \qquad \text{[Formula 2]}$$

Figure 12:
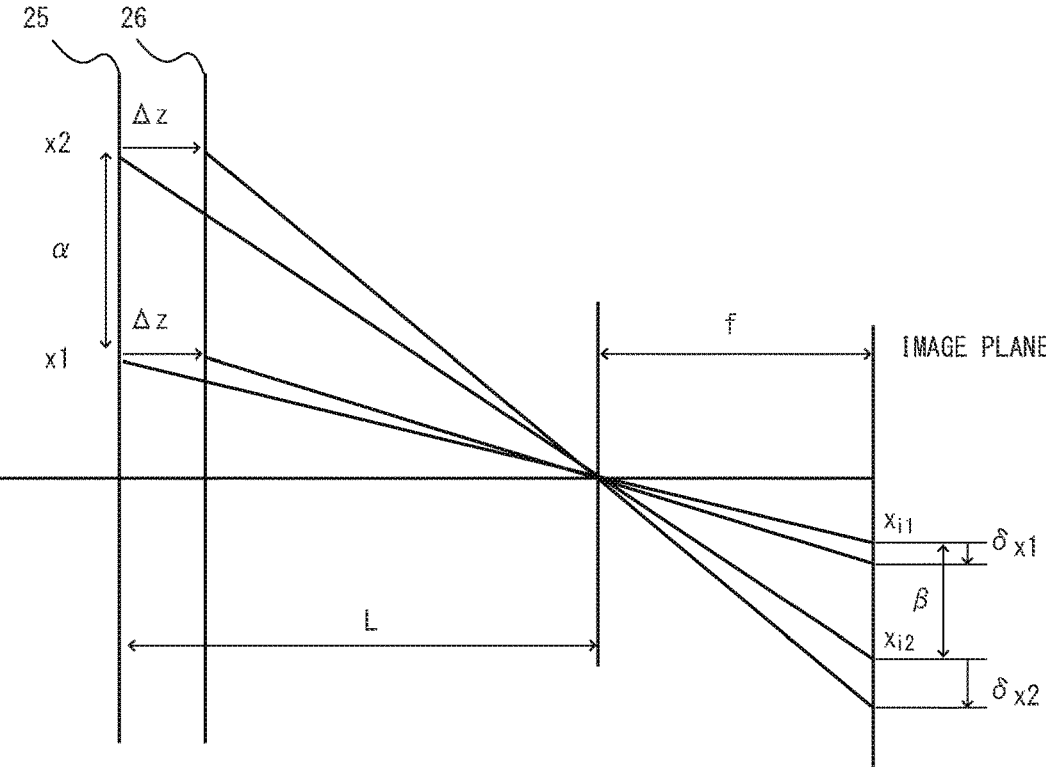
FIG. 12 is a diagram for describing processing for calculating depth movement amount by an out-of-plane displacement calculation unit.

In the first example embodiment, the out-of-plane displacement calculation unit 3 calculates the out-of-plane displacements $\delta x_i$ and $\delta y_i$ from the above-described depth movement amount $\Delta z$. FIG. 12 is a diagram for describing the processing for calculating the depth movement amount $\Delta z$ by the out-of-plane displacement calculation unit 3.

Assume, as illustrated in FIG. 12, that a point located at the coordinate $x_i$ and a point located at a coordinate $x_2$ on the surface 25 of the object uniformly move by $\Delta z$ in the optical axis direction of the image capturing apparatus 101. In this case, the out-of-plane displacement of the point located at the coordinate $x_i$ is $\delta x_i$, and the out-of-plane displacement of the point located at the coordinate $x_2$ is $\delta x_2$. Here, $\Delta z$ is derived from Formula 4, using a difference $\delta d$ between the out-of-plane displacements $\delta x_i$ and $\delta x_2$ indicated by Formula 3.

Also, the coordinate when the point located at the coordinate $x_1$ is projected onto the image plane is given as $x_{i1}$, and the coordinate when the point located at the coordinate $x_2$ is projected onto the image plane is given as $x_{i2}$. The relationship between a distance $\alpha$ and a distance $\beta$ is represented by Formula 5, where $\alpha$ is the distance between the coordinate $x_1$ and the coordinate $x_2$, and $\beta$ is the distance between the coordinate $x_{i1}$ and the coordinate $x_{i2}$ that are projected onto the image plane. The difference $\delta d$ has similar characteristics to the differences [A–D], [B–D] and [C–D] of the displacement amounts illustrated in FIG. 10B, and can thus be calculated by the difference calculation unit 2. Accordingly, the out-of-plane displacement calculation unit 3 calculates the depth movement amount $\Delta z$, using the following Formulas 3 and 4.

$$\delta_d = \delta_{x2} - \delta_{x1} \qquad \text{[Formula 3]}$$

$$\Delta z = \delta_d \frac{L}{\delta_d + \beta} \qquad \text{[Formula 4]}$$

$$\beta = \frac{\alpha f}{L} \qquad \text{[Formula 5]}$$

Figure 13A:
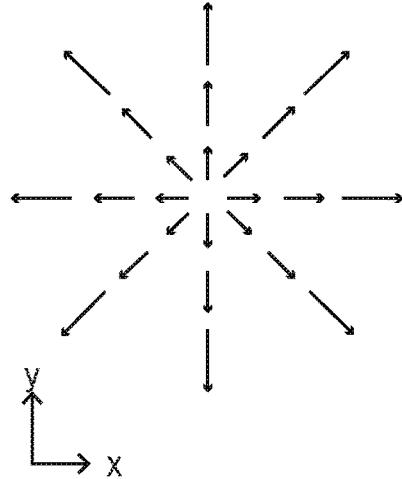
FIG. 13A is a diagram illustrating an out-of-plane displacements on image plane in case where the object moves uniformly in an optical axis direction of the image capturing apparatus.
Figure 13B:
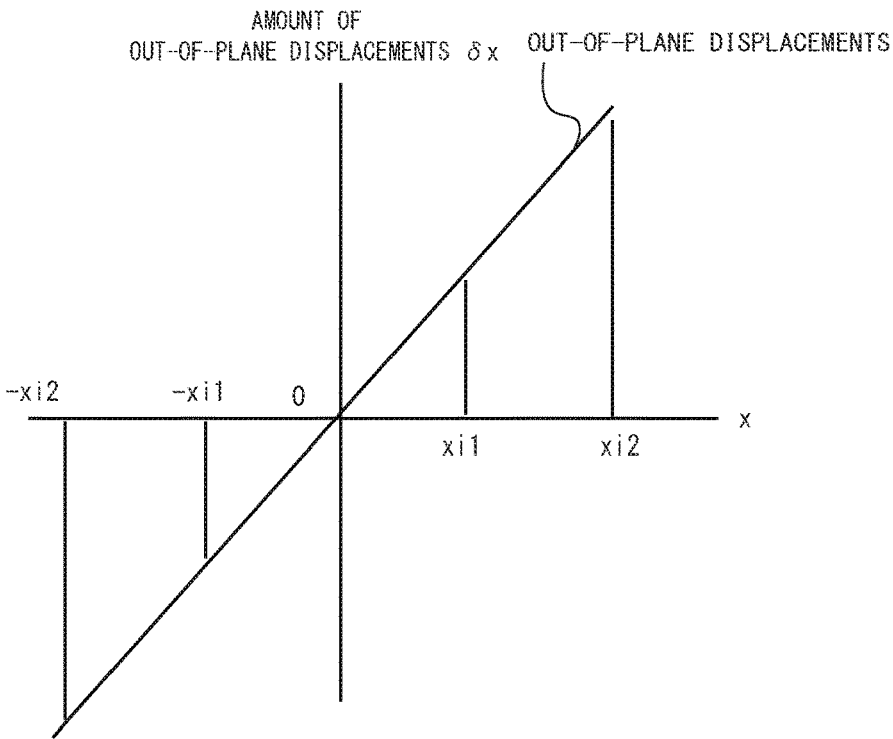
FIG. 13B is a diagram illustrating relationship between out-of-plane displacements and distance from an image capturing center in case where the object moves uniformly in the optical axis direction of the image capturing apparatus.
Figure 13C:
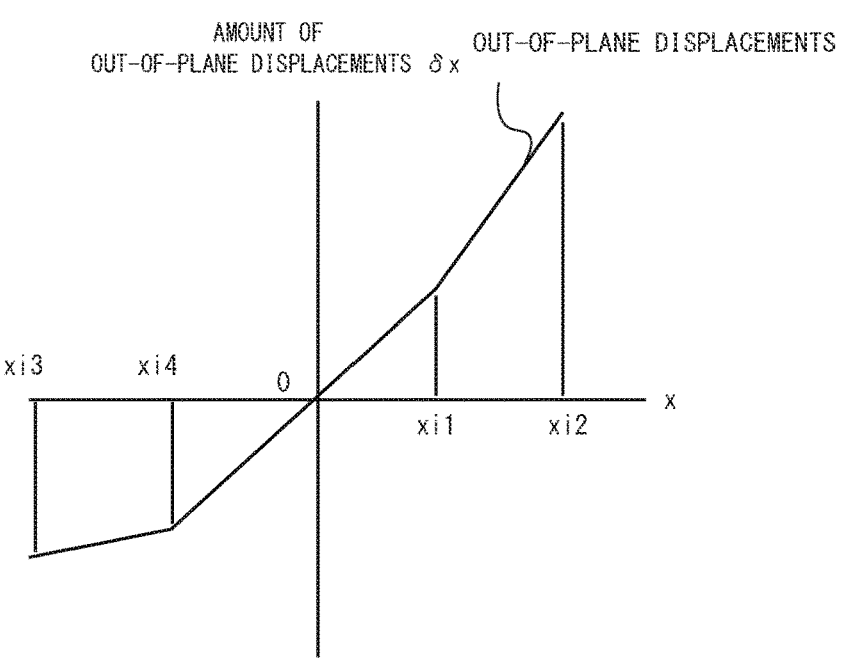
FIG. 13C is a diagram illustrating relationship between the out-of-plane displacements and the distance from the image capturing center when the object does not move uniformly in the optical axis direction of the image capturing apparatus.

The out-of-plane displacements will now be described in detail, using FIGS. 13A to 13C. FIG. 13A is a diagram illustrating an out-of-plane displacements on the image plane in the case where the object 20 moves uniformly in the optical axis direction of the image capturing apparatus 101. FIG. 13B is a diagram illustrating the relationship between the out-of-plane displacements and the distance from the image capturing center in the case where the object 20 moves uniformly in the optical axis direction of the image capturing apparatus 101. FIG. 13C is a diagram illustrating the relationship between the out-of-plane displacements and the distance from the image capturing center when the object 20 does not move uniformly in the optical axis direction of the image capturing apparatus 101.

For example, assume, as illustrated in FIG. 12, that the object 20 uniformly moves in the optical axis direction of the image capturing apparatus 101. In this case, as illustrated in FIG. 13A, the out-of-plane displacements on the image plane will be a radial vector group centered on the optical axis of the image capturing apparatus 101. In other words, the out-of-plane displacement vectors increase in proportion to the distance from the image capturing center (based on the above Formula 1). At this time, the magnitude of the out-of-plane displacement δx in the x-axis direction, for example, is a straight line as illustrated in FIG. 13B. The slope of this straight line corresponds to the depth movement amount Δz.

Also, in the case where the movement of the object 20 in the optical axis direction of the image capturing apparatus 101 is not uniform, the slope of the temporal change in out-of-plane displacement is different in each of section ($x_{i3}$, $x_{i4}$), section ($x_{i4}$, $x_{i1}$) and section ($x_{i1}$, $x_{i2}$), as illustrated in FIG. 13C. In this case, the depth movement amount Δz differs in each section. Accordingly, the out-of-plane displacement calculation unit 3 calculates the out-of-plane displacements from the depth movement amount Δz that corresponds to each section, based on Formula 1.

Figure 14A:
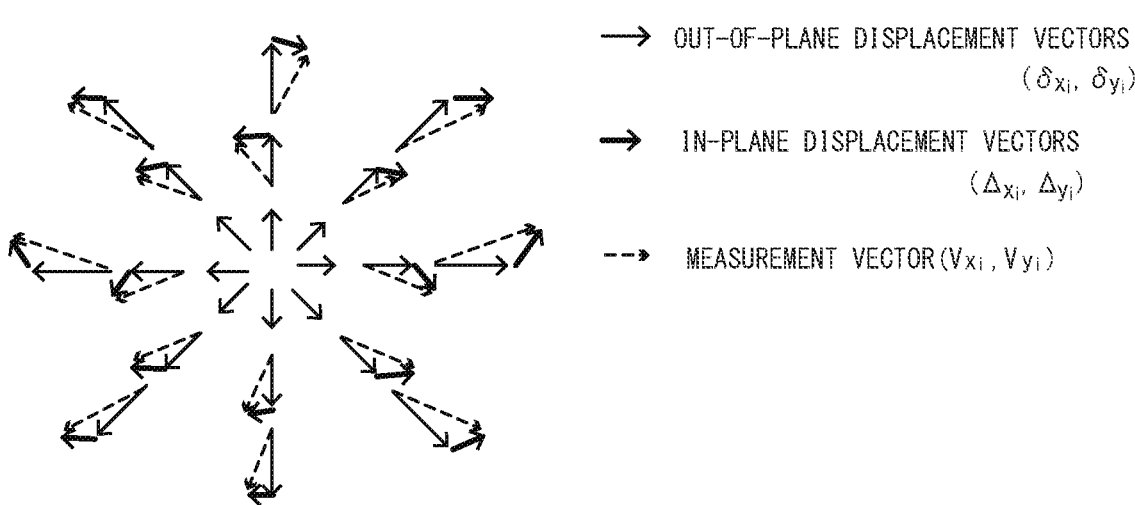
FIG. 14A is a diagram illustrating relationship between the out-of-plane displacements and in-plane displacements on the image plane in the case where the object moves uniformly in the optical axis direction of the image capturing apparatus.
Figure 14B:
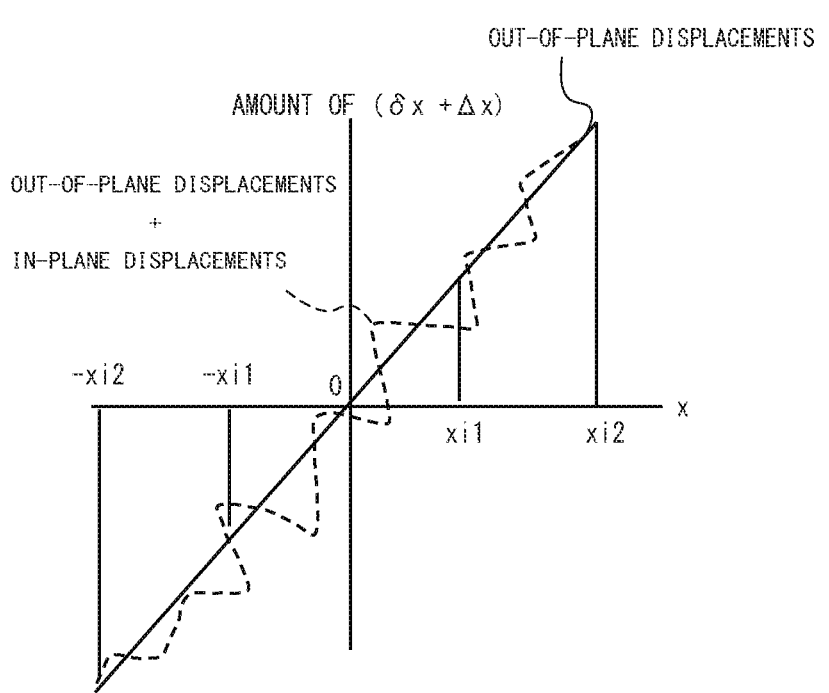
FIG. 14B is a diagram illustrating relationship between total of the out-of-plane displacements and the in-plane displacements and the distance from the image capturing center in the case where the object moves uniformly in the optical axis direction of the image capturing apparatus.
Figure 14C:
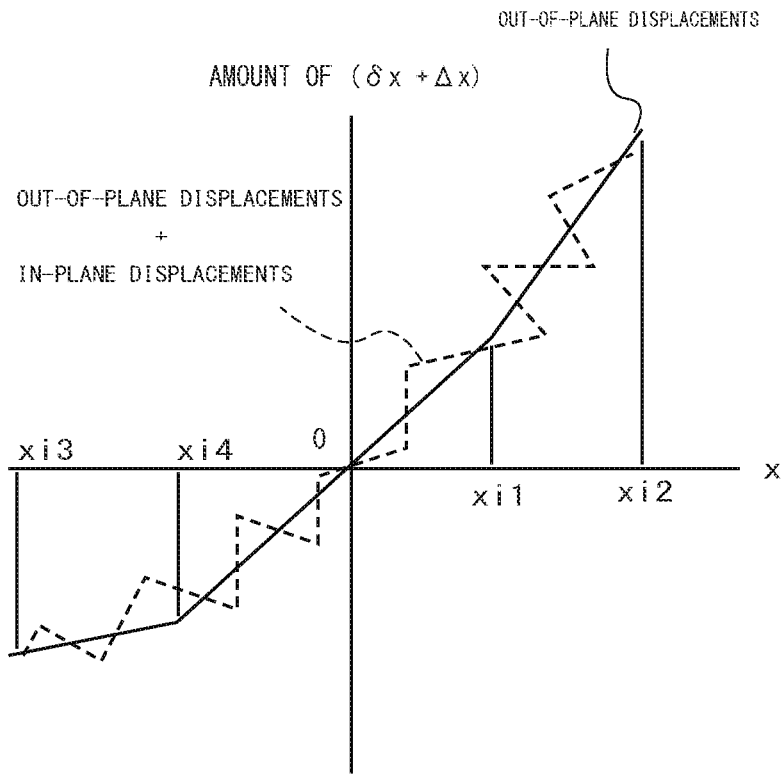
FIG. 14C is a diagram illustrating relationship between the total of the out-of-plane displacements and the in-plane displacements and the distance from the image capturing center in the case where the object does not move uniformly in the optical axis direction of the image capturing apparatus.

The relationship between the out-of-plane displacement vectors and the in-plane displacement vectors will now be described, using FIGS. 14A to 14C. FIG. 14A is a diagram illustrating the relationship between the out-of-plane displacements and the in-plane displacements on the image plane in the case where the object moves uniformly in the optical axis direction of the image capturing apparatus. FIG. 14B is a diagram illustrating the relationship between the total of out-of-plane displacements and in-plane displacements and the distance from the image capturing center in the case where the object moves uniformly in the optical axis direction of the image capturing apparatus. FIG. 14C is a diagram illustrating the relationship between the total of the out-of-plane displacements and the in-plane displacements and the distance from the image capturing center in the case where the object does not move uniformly in the optical axis direction of the image capturing apparatus.

In FIG. 14A, the dotted arrows represent the displacement amounts of the specific points in the time-series fixed images calculated by the difference calculation unit 2 and illustrated in FIG. 10B (hereinafter referred to as measurement vector V ($Vx_i$, $Vy_i$)). The measurement vector V ($Vx_i$, $Vy_i$) is a composite vector of the out-of-plane displacement vector δ ($δx_i$, $δy_i$) and the in-plane displacement vector Δ ($Δx_i$, $Δy_i$).

The solid lines illustrated in FIGS. 14B and 14C are the out-of-plane displacement vectors (x component) illustrated in FIGS. 13B and 13C. The dashed lines illustrated in FIGS. 14B and 14C are displacement amounts calculated by the difference calculation unit 2, and are measurement vectors (x component) obtained by adding the in-plane displacement vectors (x component) to the out-of-plane displacement vectors. In the case where the magnitude of the in-plane displacements is sufficiently small relative to the magnitude of the out-of-plane displacements described above, Δz obtained by Formula 4 can be approximated to the depth movement amount. Accordingly, in the out-of-plane displacement calculation unit 3, the out-of-plane displacement in each section is obtained by substituting Δz in Formula 1.

Furthermore, the in-plane displacement vectors (x component) can be separated, by subtracting the out-of-plane displacement vectors (x component) from the measurement vectors (x component) at each point in the sections calculated by the difference calculation unit 2. Separation of the out-of-plane displacement vectors (x component) is performed by the in-plane displacement calculation unit 4.

Here, a method for calculating the out-of-plane displacements from out-of-plane displacements obtained through projection in the x direction is described, but the out-of-plane displacements can also be calculated for the y direction orthogonal to the optical axis direction (z direction) of the lens of the image capturing apparatus 101 and to the x direction, with a similar method to the x direction.

In the first example embodiment, the abnormality determination unit 5 estimates abnormalities of the blades 21 of the object 20. The processing by the abnormality determination unit 5 will be described using FIGS. 15 to 17.

In the first example embodiment, the abnormality determination unit 5 analyzes the out-of-plane displacement distribution of the rotating object 20 at each point in time. The abnormality determination unit 5 also analyzes the in-plane displacement distribution of the rotating object. The abnormality determination unit 5 then performs abnormality determination of the object 20, using the analysis result of the out-of-plane displacement distribution and the analysis result of the in-plane displacement distribution. This will now be specifically described.

Figure 15A:
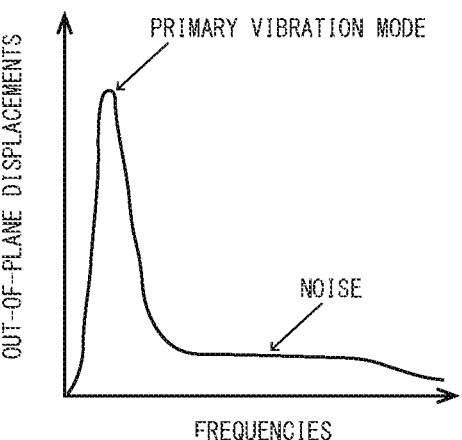
FIG. 15A is a diagram illustrating frequency characteristics of displacement at the specific point A illustrated in FIG. 8.
Figure 15B:
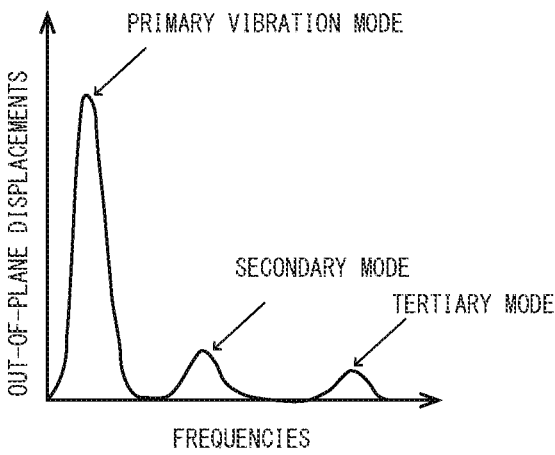
FIG. 15B is a diagram illustrating frequency characteristics of difference [A-D] between the displacement amount of the specific point A and the displacement amount of the specific point D illustrated in FIG. 8.

First, analysis of the out-of-plane displacement will be described. FIGS. 15A and 15B are diagrams illustrating the frequency characteristics of an object 20 that vibrates due to rotation. FIG. 15A is a diagram illustrating the frequency characteristics of displacement at the specific point A illustrated in FIG. 8. FIG. 15B is a diagram illustrating the frequency characteristics of the difference [A–D] between the displacement amount of the specific point A and the displacement amount of the specific point D illustrated in FIG. 8.

The object 20 is a propeller, and the blades 21 forms a cantilever beam. The blades 21 thus have a natural vibration mode that corresponds to the size and material thereof, and a frequency component corresponding to the natural vibration mode appears in the vibration frequency characteristics thereof.

As illustrated in FIG. 15A, in the out-of-plane displacement of the specific point A, the natural frequency of a primary vibration mode of the object 20 appears, but the frequency components of higher order vibration modes are buried in the excess vibration (noise) that occurs in the rotating object 20 and cannot be detected.

On the other hand, as illustrated in FIG. 15B, when noise is suppressed, the natural frequencies of a secondary mode and a tertiary mode of the object 20 become detectable, in addition to the natural frequency of the primary mode. In this way, when the difference calculation unit 2 takes the specific point D illustrated in FIG. 8 as a reference specific point and suppresses noise by deriving the difference between the displacement amount of the specific point D and the displacement amount of each of the specific points A, B and C, it becomes possible to evaluate the vibration state of the object 20 more precisely, as illustrated in FIG. 15B.

Note that the difference calculation unit 2 may calculate the displacement in the surface of the object 20 with an image correlation computation, based on the correlation or change of the images between the frames of the time-series images. The difference calculation unit 2 is able to calculate displacement amounts at a level of 1/100 of the pixel pitch of the image capturing apparatus 101, by using quadratic curve interpolation in the image correlation computation. Alternatively, the difference calculation unit 2 may calculate the displacement amounts, using a gradient method, instead of image correlation computation.

Figure 16A:
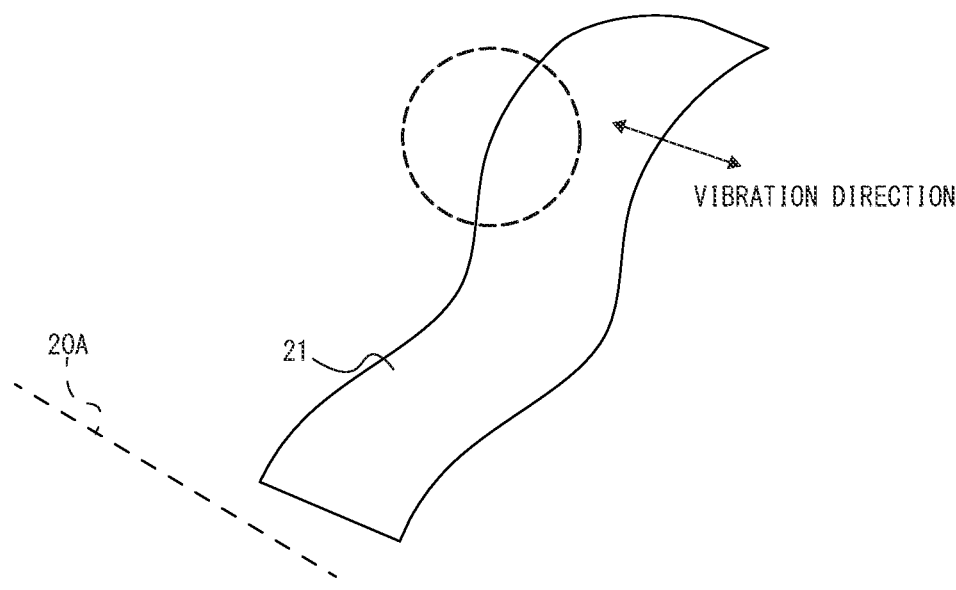
FIG. 16A is a diagram schematically illustrating a portion of an object targeted for state determination.
Figure 16B:
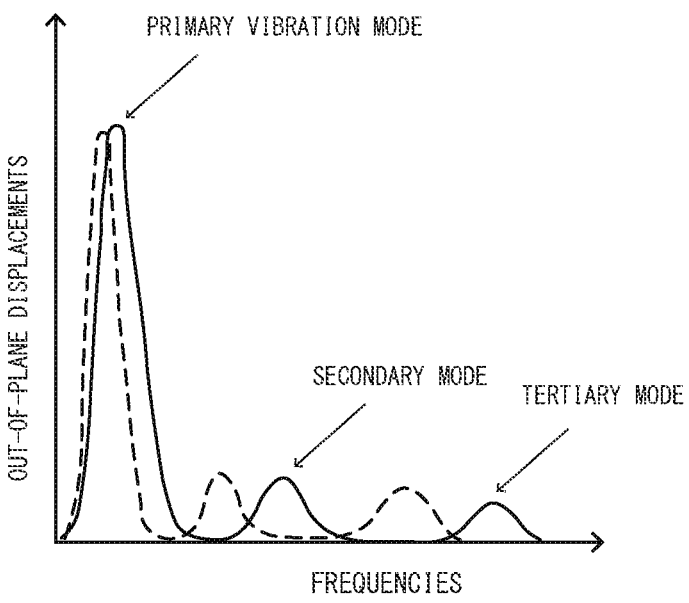
FIG. 16B is a diagram illustrating the relationship between the out-of-plane displacement of the portion of the object illustrated in FIG. 16A and the frequency of vibration.

Out-of-plane displacement in the case where there is an abnormality in the blades 21 of the object 20 will be described, using FIGS. 16A and 16B. FIG. 16A is a diagram schematically illustrating a portion of an object targeted for state determination. FIG. 16B is a diagram illustrating the relationship between the out-of-plane displacement of the portion of the object illustrated in FIG. 16A and the frequency of vibration. Note that, in FIG. 16A, a state where vibration occurs in the normal direction of the blades 21 is illustrated.

Also, in the following description, the specifications of the blades 21 of the object 20 are assumed to be as follows. In FIG. 16A, reference numeral 20A denotes the rotation axis of the blades 21.

Length: 700 mm
    Width: 150 mm
    Thickness: 3 mm
    Material: Steel
    Number of rotations (rotation speed): 2000 rpm When the blades 21 are rotated at the above number of rotations, the respective natural frequencies of the primary mode, the secondary mode and the tertiary mode in the normal direction of the object surface will be 10 Hz, 50 Hz and 150 Hz, assuming no abnormalities have occurred in the blades 21. The natural frequency of each mode in this case is assumed to be registered in advance in a storage device or the like.

Also, assume that an abnormality such as a breakage has occurred in a portion of the blades 21 of the object 20 (portion surrounded by a dashed line in FIG. 16A). In this case, the displacement distribution of the out-of-plane displacement of the blades 21 is as illustrated in FIG. 16B. Note that, in measurement of the displacement portion, the distance (image capturing distance) between the image capturing apparatus 101 and the object 20 is set to 5 m, and the focal length of the lens of the image capturing apparatus 101 is set to 200 mm. Also, the pixel pitch of the image sensor is 4 μm, and the image sensor has a resolution of 0.1 mm per pixel.

In FIG. 16B, the solid line indicates the case where an abnormality has not occurred the blades 21. On the other hand, the dashed line indicates the case where an abnormality has occurred in in the blades 21. As illustrated in FIG. 16B, when an abnormality has occurred, a decrease in the natural frequency of the modes is observed compared to the case where an abnormality has not occurred.

Accordingly, in the first example embodiment, the abnormality determination unit 5 determines whether an abnormality has occurred in the object 20, based on the difference in the out-of-plane displacement distribution between the case where an abnormality has occurred in the object 20 and the case where an abnormality has not occurred.

Figure 17A:
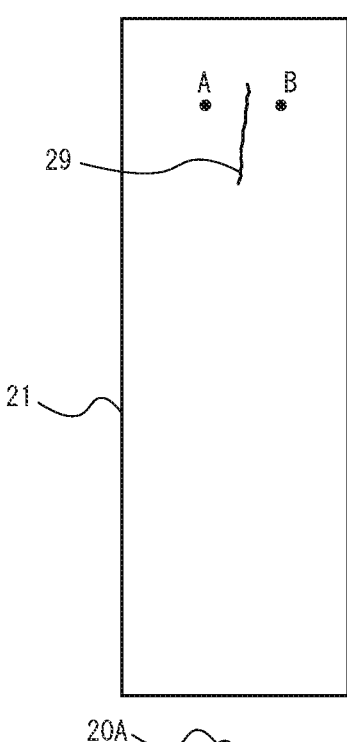
FIG. 17A is a diagram schematically illustrating a stationary state of part of the object in which a crack has occurred.
Figure 17B:
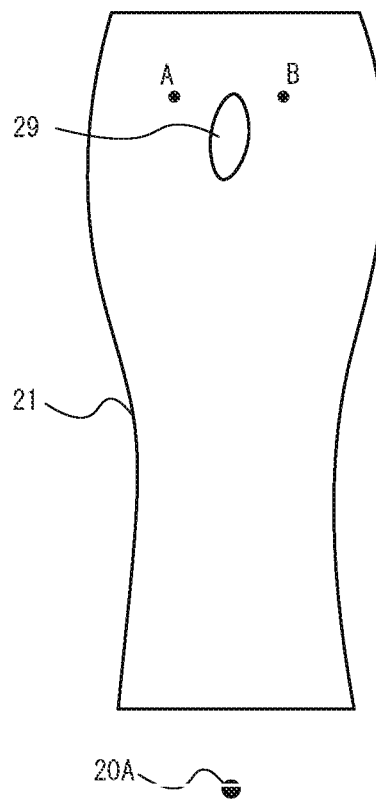
FIG. 17B is a diagram schematically illustrating a state in which the part of the object illustrated in FIG. 17A is performing rotational motion.
Figure 17C:
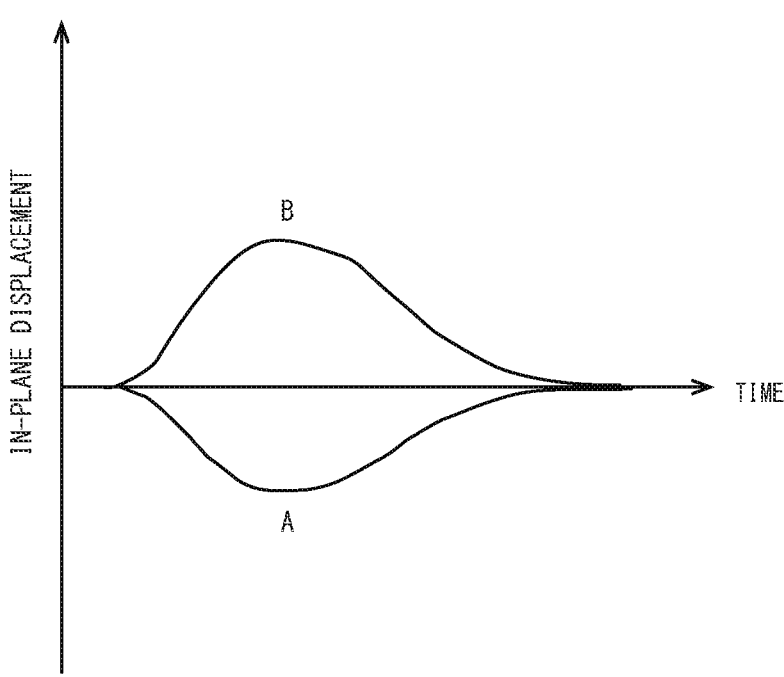
FIG. 17C is a diagram illustrating the temporal change in the in-plane displacement of the portion of the object illustrated in FIG. 17A.
Figure 17D:
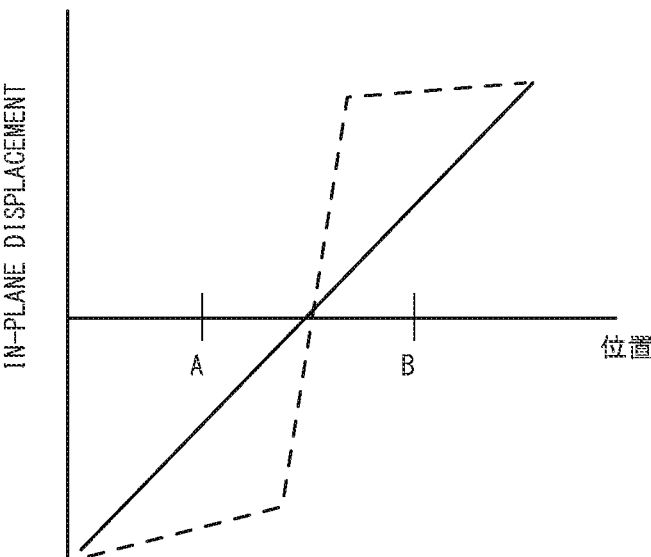
FIG. 17D is a diagram illustrating relationship between in-plane displacement and position of the portion of the object illustrated in FIG. 17A.

Next, the analysis of in-plane displacement will be described. FIGS. 17A, 17B, 17C and 17D are diagrams illustrating in-plane displacement in the case where there is a crack in the blades 21. FIG. 17A is a diagram schematically illustrating a stationary state of part of the object in which a crack has occurred. FIG. 17B is a diagram schematically illustrating a state in which the part of the object illustrated in FIG. 17A is performing rotational motion. FIG. 17C is a diagram illustrating the temporal change in the in-plane displacement of the portion of the object illustrated in FIG. 17A. FIG. 17D is a diagram illustrating the relationship between in-plane displacement and position of the portion of the object illustrated in FIG. 17A.

Assume, as illustrated in FIG. 17A, that a crack 29 has occurred in the blade 21 of the object 20. In FIG. 17A, points A and B are arbitrary points, and are located where the crack 29 of the blade 21 is sandwiched therebetween. In this case, when the object 20, which is a propeller, rotates, the crack 29 in the blade 21 opens and closes as illustrated in FIG. 17B due to the rotational motion of the blade 21, and the points A and B are displaced by the rotational motion of the blade 21. Also, the in-plane displacement at points A and B changes over time, according to the rotational motion, as illustrated in FIG. 17C. In other words, the in-plane displacement of points A and B changes, as a result of the crack 29 opening and closing due to the rotational motion.

Here, imagine a straight line passing through points A and B on the blade 21. In this case, the in-plane displacement on the straight line is as illustrated in FIG. 17D. In FIG. 17D, the solid line indicates the in-plane displacement in the case where the crack 29 has not occurred in the blade 21. In this case, the in-plane displacement distribution is continuous. On the other hand, in FIG. 17D, the dashed line indicates the in-plane displacement in the case where the crack 29 has occurred in the blade 21. In this case, the in-plane displacement distribution changes sharply between point A and point B.

As can be seen from FIG. 17D, the in-plane displacement distribution differs between the case where the crack 29 has occurred in the blade 21 and the case where the crack 29 has not occurred. Accordingly, in the first example embodiment, the abnormality determination unit 5 determines whether an abnormality has occurred in the object 20, also based on the difference in the in-plane displacement distribution between the case where the crack 29 has occurred in the object 20 and the case where a crack has not occurred.

As described above, the abnormality determination unit 5 determines abnormalities of an object, by analyzing the out-of-plane displacement and the in-plane displacement of the object at each point in time. Also, the abnormality determination unit 5 may determine abnormalities of the object by analyzing only one of the out-of-plane displacement and the in-plane displacement, or may determine abnormalities of the object by analyzing both.

[Apparatus Operation]

Figure 18:
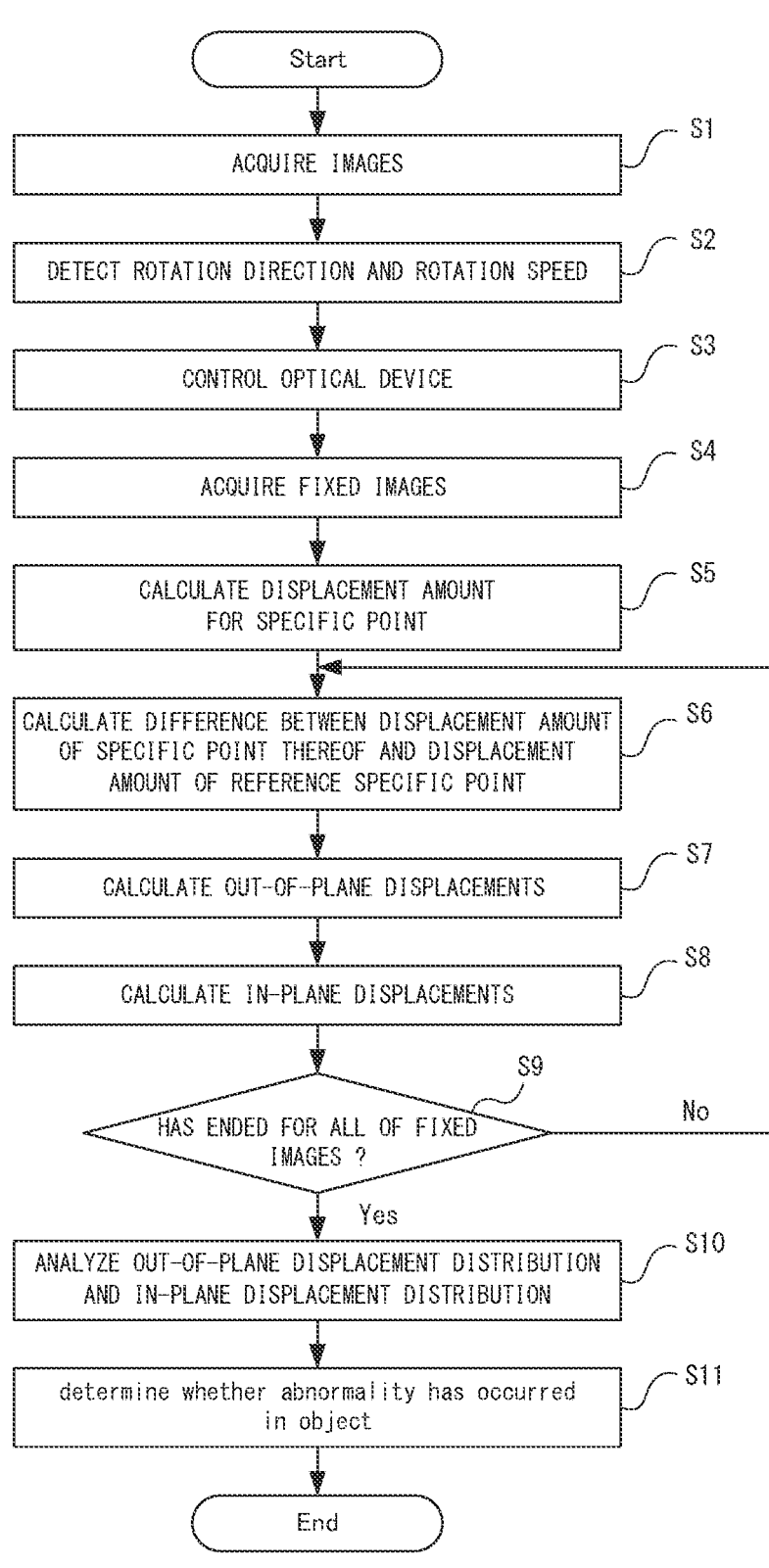
FIG. 18 is a flow diagram illustrating operations of the state determination apparatus in the first example embodiment.

Next, operations of the state determination apparatus 100 in the first example embodiment will be described. FIG. 18 is a flow diagram illustrating operations of the state determination apparatus 100 in the first example embodiment. In the following description, other diagrams will be referred to as appropriate. Also, in the first example embodiment, a state determination method is implemented by operating the state determination apparatus 100. Therefore, the following description of the operations of the state determination apparatus 100 replaces a description of the state determination method in the first example embodiment.

As illustrated in FIG. 18, first, the fixed image acquisition unit 1 acquires time-series images obtained as a result of the image capturing apparatus 101 capturing images of the surface of the object 20 in a state where rotation control of the optical device 102 is not performed (S1).

Next, the fixed image acquisition unit 1 detects the rotation direction and rotation speed of the blades 21 of the rotating object 20, as illustrated in FIGS. 6A and 6B, using a combination an mth (≥1) image and an m+1th image that are included in the time-series images (S2). Note that the target blade may be another blade.

Next, the fixed image acquisition unit 1 controls the optical device 102, based on the detected rotation direction and rotation speed (S3). Specifically, the fixed image acquisition unit 1 controls the rotary optical systems 32 and 33 of the optical device 102, such that the image that is incident on the optical device 102 rotates at the same speed as the rotation speed of the blades 21 in the opposite direction to the blades 21 of the object 20.

The fixed image acquisition unit 1 then acquires a time-series of captured images captured by the image capturing apparatus 101 through the rotating dove prisms 35 and 36 as a time-series of fixed images (S4). Acquisition of fixed images in step S4 is, for example, performed for a set time period or until a predetermined number of frames is reached.

Next, upon the time-series fixed images being acquired in step S4, the difference calculation unit 2 sets specific points, and calculates a temporal displacement amount for each specific point, using the acquired time-series fixed images (S5).

Next, as illustrated in FIG. 9, the difference calculation unit 2 takes, as a reference specific point, one of the specific points whose displacement amount was derived, and calculates, for each of the other specific points, the difference between the displacement amount thereof and the displacement amount of the reference specific point (S6).

Next, the out-of-plane displacement calculation unit 3 estimates the depth movement amount Δz, using the differences in the displacement amounts calculated in step S6, and calculates the out-of-plane displacements (z-direction contribution amount) from the depth movement amount Δz (S7).

Next, as illustrated in FIG. 14A, the in-plane displacement calculation unit 4 calculates the in-plane displacements of the object, using the differences calculated in step S6 and the out-of-plane displacements calculated in step S7 (S8).

After executing step S8, the fixed image acquisition unit 1 determines whether the processing of steps S5 to S8 has ended for all of the fixed images acquired in S4 (S9). If the result of the determination in step S9 indicates that the processing of steps S5 to S8 has not ended for all of the fixed images (S9: No), step S5 is executed again on a fixed image for which processing has not ended.

On the other hand, if the result of the determination of step S9 indicates that the processing of steps S5 to S8 has ended for all of the fixed images (S9: Yes), step S10 is executed.

In step S10, the abnormality determination unit 5 analyzes either or both of the out-of-plane displacement distribution and the in-plane displacement distribution of the blades 21 of the object 20 (S10). The abnormality determination unit 5 then determines whether an abnormality has occurred in the object 20, based on the result of the analysis in step S10 (S11).

After the above-described step S11, the abnormality determination unit 5 may display the diagnostic results of the state of the object 20 on a display device, or may transmit the diagnostic results to the terminal device of the user connected by a network or the like. The user is thereby able to view the output diagnostic results and determine whether repair or a detailed investigation of the object 20 is necessary, for example.

(Effect of First Example Embodiment)

According to the configuration of the first example embodiment, abnormalities of the object are determined using images of a rotating object captured by one image capturing apparatus 101, thus enabling an increase in apparatus size to be suppressed. Also, in the first example embodiment, it becomes possible for the optical device 102 to acquire fixed images in which motion blur (moving image blur) is suppressed at the time of shooting images of an object. Furthermore, the influence of vibration caused by rotation is also suppressed in the fixed images. Thus, in the first example embodiment, sufficient accuracy is guaranteed for measurement of in-plane displacement and out-of-plane displacement using images, thus enabling abnormalities of a rotating object to be accurately detected.

Additionally, in the first example embodiment, since the optical device 102 can be provided with a plurality of dove prisms, the dove prisms can be rotated at high speed with a small driving force, and thus it becomes possible to appropriately suppress motion blur, according to the rotation speed of the object targeted for state determination. Also, in the first example embodiment, only one image capturing apparatus is used, and thus the cost of capturing images of the object can be reduced.

[Program]

It suffices for the program in the first example embodiment to be a program that causes a computer to carry out steps S1 to S11 illustrated in FIG. 18. The computer is configured by combining hardware such as CPU (for example, a multi-processor on which a plurality of processor core is mounted), graphics processing units (GPU), digital signal processors (DSP), field-programmable gate arrays (FPGA), and application specific integrated circuits (ASIC). By installing this program on a computer and executing the program, the state determination apparatus and the state determination method in the first example embodiment can be realized. In this case, one or more processors of the computer function and perform processing as the fixed image acquisition unit 1, the difference calculation unit 2, the out-of-plane displacement calculation unit 3, the in-plane displacement calculation unit 4, and the abnormality determination unit 5.

Furthermore, besides a general-purpose PC, a smartphone and a tablet-type terminal device can be mentioned as examples of the computer.

The program in the first example embodiment may be executed by a computer system constructed from a plurality of computers. In this case, the computers may each function as one of the fixed image acquisition unit 1, the difference calculation unit 2, the out-of-plane displacement calculation unit 3, the in-plane displacement calculation unit 4, and the abnormality determination unit 5.

Second Example Embodiment

Next, a second example embodiment will be described hereinafter. In the second example embodiment, the state determination apparatus is configured to be able to track a rotating object within the angle of view of the image capturing apparatus, in the case where an image capturing apparatus is mounted on a moving object such as a drone, for example. The second example embodiment may also be applied to the case where the rotating object moves translationally and the image capturing apparatus is fixed. The second example embodiment differs from the first example embodiment in this respect. In addition to the optical device (first optical device) 102 described in the first example embodiment, the state determination apparatus of the second example embodiment has an optical device (second optical device) 103 for acquiring fixed images in which the translational movement of the object is cancelled out.

Figure 19:
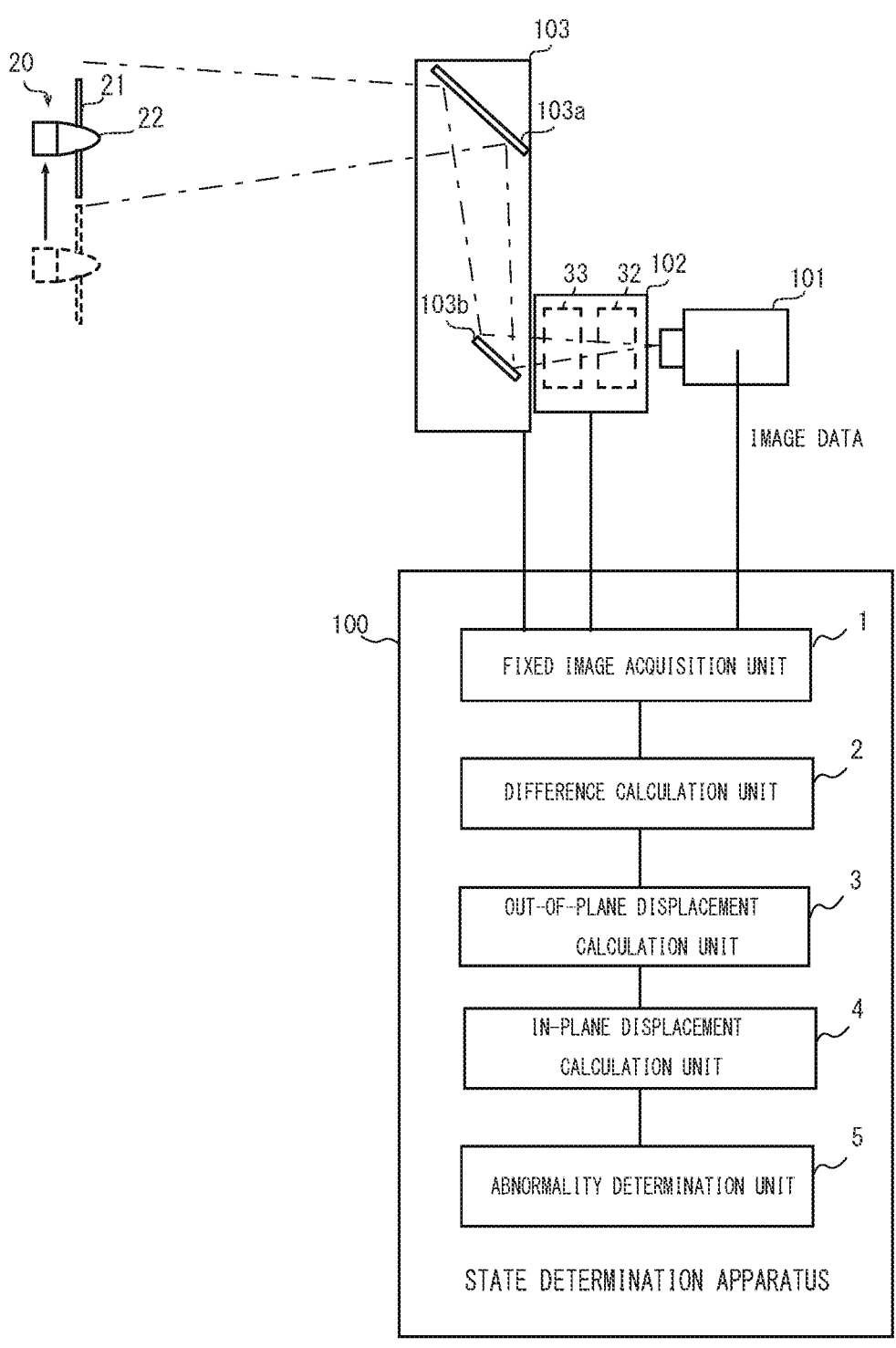
FIG. 19 is a block diagram illustrating a configuration of the state determination apparatus according to second example embodiment.
Figure 20:
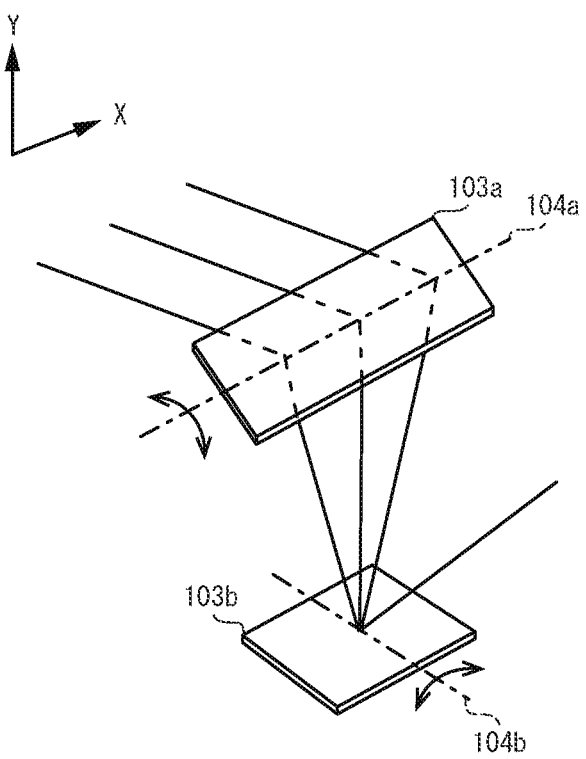
FIG. 20 is a diagram illustrating a configuration of the optical device.
Figure 21:
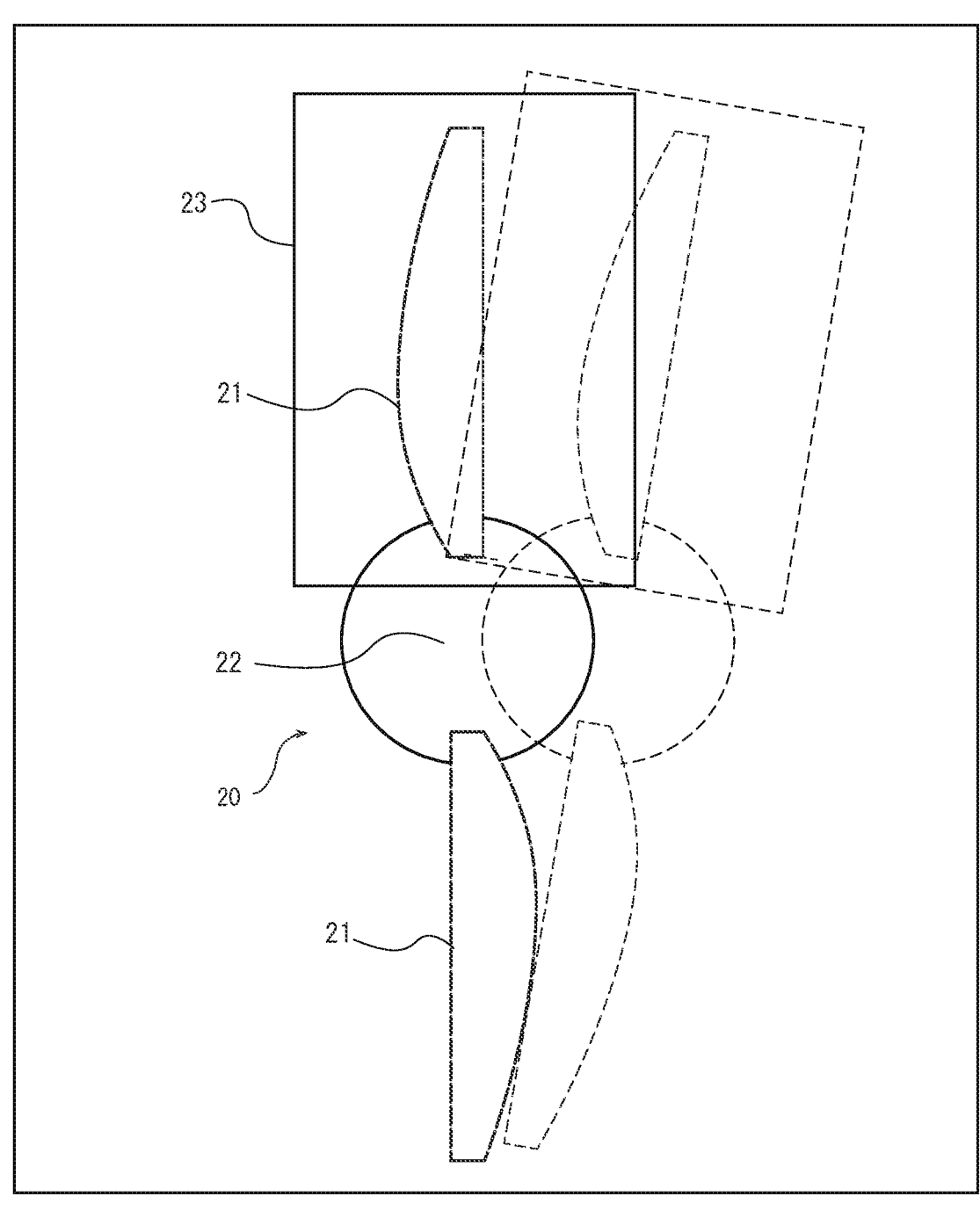
FIG. 21 is a diagram schematically illustrating a translationally moving object.

FIG. 19 is a block diagram illustrating a configuration of the state determination apparatus according to the second example embodiment. FIG. 20 is a diagram illustrating a configuration of the optical device 103. FIG. 21 is a diagram schematically illustrating a translationally moving object 20. In FIG. 21, time-series images of the object 20 are illustrated, with the thick dashed line indicating the image of the object 20 in the specific frame, and the thin dashed line indicating the image of the object in the next frame.

As illustrated in FIG. 19, in the second example embodiment, the optical device 103 is disposed between the object 20 and the optical device 102. The optical device 103 is provided with a first mirror 103*a* and a second mirror 103*b*. The first mirror 103*a* reflects an image of the object 20 and causes the reflected light to be incident on the second mirror 103*b*. The second mirror 103*b* further reflects the light incident thereon to be incident on the optical device 102.

Also, the optical device 103 performs so-called pan and tilt control (pan direction=x direction, tilt direction=y direction) for tracking a rotating object, as a result of the first mirror 103*a* changing its angle centered on a rotation axis 104*a*, and the second mirror 103*b* changing its angle centered on a rotation axis 104*b* that is orthogonal to the rotation axis 104*a*. A servo motor, for example, can be used as an angle control mechanism of the first mirror 103*a* and the second mirror 103*b*.

Also, the directions of the two axes about which the mirrors are movable by a drive mechanism are directions perpendicular to the optical axis of the image capturing apparatus in the example in FIG. 19. Thus, when the object 20 moves translationally, the first mirror 103*a* is able to move so as to track the movement of the object, due to the drive mechanism.

In addition to the processing described in the first example embodiment, the fixed image acquisition unit 1 also performs control of the optical device 103 in the second example embodiment. Specifically, upon acquiring time-series images (or fixed images) from the image capturing apparatus 101, the fixed image acquisition unit 1 detects the translational movement direction of the object 20 and the movement amount at a time of translational movement, by contrasting the frames, for a portion (e.g., spinner 22) near the rotational center of the object 20. The fixed image acquisition unit 1 then drives the servo motor that performs angle control of the first mirror 103*a* and the second mirror 103*b*, in correspondence with the detected translational movement direction and movement amount at a time of translational movement.

As a result, images of the rotational center of the object 20 and neighboring portions thereof will always be located at the same coordinates in the image data output by the image capturing apparatus 101. Thus, even if the object 20 moves outside the field of view of the image capturing apparatus 101, this movement can be tracked. Accordingly, for example, in the image capturing apparatus 101, a high resolution lens with a small angle of view such as a telephoto lens can be used, and thus, according to the second example embodiment, highly accurate displacement measurement over a wide area becomes possible.

Note that, in the second example embodiment, the optical device 103 is not limited to the configuration described above. The optical device 103 may be any device that is able to track translational movement of an object and take images of the object. The optical device 103 may additionally have a function of tracking the object 20 optically.

The state determination apparatus 100 also similarly executes steps S1 to S11 illustrated in FIG. 18 in the second example embodiment. The state determination method according to the second example embodiment is also similarly executed by operating the state determination apparatus 100. Also, a program in the second example embodiment may also similarly be any program that causes a computer to execute steps S1 to S11 illustrated in FIG. 18.

In the second example embodiment, however, the fixed image acquisition unit 1, in steps S1 and S4, also performs processing for causing the optical device 103 to perform a tracking operation. The second example embodiment only differ from the first example embodiment in this respect.
(Effect of Second Example Embodiment)

In the second example embodiment, similarly to the first example embodiment, the state determination apparatus 100 is able to calculate the out-of-plane displacement and the in-plane displacement of the object itself, by suppressing vibration that occurs due to rotation, and to accurately detect abnormalities of a rotating object. Furthermore, similarly to the first example embodiment, abnormalities of the object are determined by capturing images of the rotating object with one image capturing apparatus 101, and thus an increase in apparatus size can be suppressed.

Also, in the second example embodiment, since the optical device 103 is used, images of the object can be taken even if the object moves outside the field of view of the image plane of the image capturing apparatus 101, and thus accurate abnormality determination of the object 20 becomes possible, even in the case where a telephoto lens with a small angle of view is mounted.
[Physical Configuration]

Figure 22:
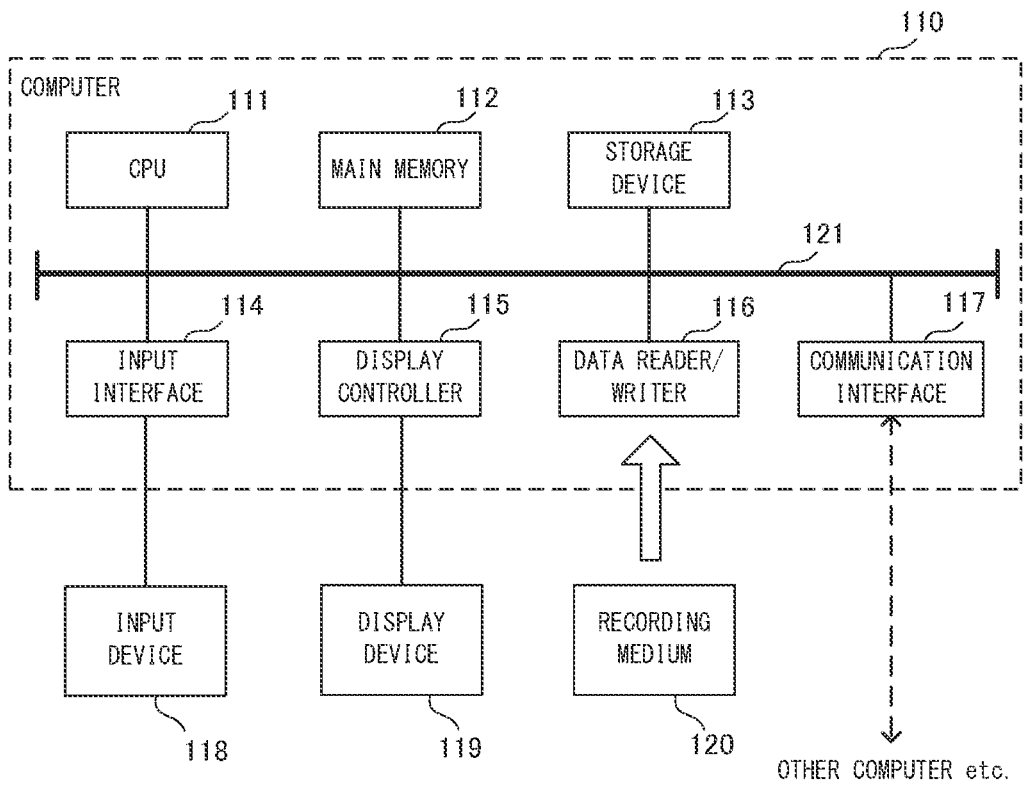
FIG. 22 is a block diagram illustrating an example of a computer that realizes the state determination apparatus according to the first and second example embodiment.

Using FIG. 22, the following describes a computer that realizes the state determination apparatus by executing the program according to the first and second example embodiment. FIG. 22 is a block diagram illustrating an example of a computer that realizes the state determination apparatus according to the first and second example embodiment.

As shown in FIG. 22, a computer 110 includes a CPU (Central Processing Unit) 111, a main memory 112, a storage device 113, an input interface 114, a display controller 115, a data reader/writer 116, and a communication interface 117. These components are connected in such a manner that they can perform data communication with one another via a bus 121.

The computer 110 may include a GPU (Graphics Processing Unit) or an FPGA (Field-Programmable Gate Array) in addition to the CPU 111, or in place of the CPU 111. In this case, the GPU or the FPGA can execute the program according to the example embodiment.

The CPU 111 deploys the program according to the example embodiment, which is composed of a code group stored in the storage device 113 to the main memory 112, and carries out various types of calculation by executing the codes in a predetermined order. The main memory 112 is typically a volatile storage device, such as a DRAM (dynamic random-access memory).

Also, the program according to the example embodiment is provided in a state where it is stored in a computer-readable recording medium 120. Note that the program according to the first and second example embodiment may be distributed over the Internet connected via the communication interface 117.

Also, specific examples of the storage device 113 include a hard disk drive and a semiconductor storage device, such as a flash memory. The input interface 114 mediates data transmission between the CPU 111 and an input device 118, such as a keyboard and a mouse. The display controller 115 is connected to a display device 119, and controls display on the display device 119.

The data reader/writer 116 mediates data transmission between the CPU 111 and the recording medium 120, reads out the program from the recording medium 120, and writes the result of processing in the computer 110 to the recording medium 120. The communication interface 117 mediates data transmission between the CPU 111 and another computer.

Specific examples of the recording medium 120 include: a general-purpose semiconductor storage device, such as CF (CompactFlash®) and SD (Secure Digital); a magnetic recording medium, such as a flexible disk; and an optical recording medium, such as a CD-ROM (Compact Disk Read Only Memory).

Note that the state determination apparatus according to the first and second embodiment can also be realized by using items of hardware that respectively correspond to the units rather than the computer in which the program is installed. Furthermore, a part of the state determination apparatus may be realized by the program, and the remaining part of the state determination apparatus may be realized by hardware.

A part or an entirety of the above-described example embodiment can be represented by (Supplementary Note 1) to (Supplementary Note 15) described below but is not limited to the description below.

(Supplementary Note 1)

A state determination apparatus includes:

a fixed image acquisition unit that acquires, as a fixed image, each of time-series images obtained by continuously shooting a rotating object with an image capturing apparatus via a first optical device that rotates and emits incident light;

a difference calculation unit that calculates a displacement amount of a plurality of specific points on the object, using each of the acquired fixed images, and, with one of the plurality of specific points as a reference specific point, calculates a difference between the displacement amount of the reference specific point and the displacement amount of each specific point other than the reference specific point;

an out-of-plane displacement calculation unit that calculates, as an out-of-plane displacement, a displacement of a surface of the object on an image plane of the image capturing apparatus following movement of the object in a normal direction of the image plane, using the difference;

an in-plane displacement calculation unit that calculates, as an in-plane displacement, a displacement of the surface of the object on the image plane following movement of the surface of the object in a direction along the surface, using the difference and the out-of-plane displacement; and an abnormality determination unit that specifies an abnormality of the object, based on a distribution of the in-plane displacement or a temporal change of the out-of-plane displacement.

(Supplementary Note 2)

The state determination apparatus according to supplementary note 1, wherein the fixed image acquisition unit acquires the fixed images, by detecting a rotation direction and rotation speed of the object, and controlling a rotation direction and rotation speed of the incident light in the first optical device, based on the detected rotation direction and rotation speed.

(Supplementary Note 3)

The state determination apparatus according to supplementary note 2, wherein the first optical device has two or more prism elements, is configured such that the two or more prism elements rotate independently to each other about an optical axis of the incident light, and is installed such that the optical axis of the incident light coincides with a normal on the image plane of the image capturing apparatus, and the fixed image acquisition unit rotates the two or more prism elements in opposite directions to each other, and controls a rotation direction and rotation speed of the two or more prism elements, such that an image captured by the image capturing apparatus through the two or more prism elements rotates at the same rotation speed as the rotation speed of the object in an opposite direction to the rotation direction of the object.

(Supplementary Note 4)

The state determination apparatus according to any one of supplementary notes 1 to 3, wherein a second optical device is disposed between the object and the first optical device, and is configured to track translational movement of the object, take an image of the object and cause the taken image to be incident on the first optical device, and the fixed image acquisition unit detects a direction of the translational movement of the object and a movement amount at a time of the translational movement, and controls the second optical device, based on the detected translational direction and translational movement amount.

(Supplementary Note 5)

The state determination apparatus according to any one of supplementary notes 1 to 4, wherein the out-of-plane displacement calculation unit derives a depth movement amount of the surface of the object that has moved in the normal direction using the difference, and calculates the out-of-plane displacement using the depth movement amount.

(Supplementary Note 6)

A state determination method comprising:

a step of acquiring, as a fixed image, each of time-series images obtained by continuously shooting a rotating object with an image capturing apparatus via a first optical device that rotates and emits incident light;

a step of calculating a displacement amount of a plurality of specific points on the object, using each of the acquired fixed images, and, with one of the plurality of specific points as a reference specific point, calculating a difference between the displacement amount of the reference specific point and the displacement amount of each specific point other than the reference specific point;

a step of calculating, as an out-of-plane displacement, a displacement of a surface of the object on an image plane of the image capturing apparatus following movement of the object in a normal direction of the image plane, using the difference;

a step of calculating, as an in-plane displacement, a displacement of the surface of the object on the image plane following movement of the surface of the object in a direction along the surface, using the difference and the out-of-plane displacement; and s step of specifying an abnormality of the object, based on a distribution of the in-plane displacement or a temporal change of the out-of-plane displacement.

(Supplementary Note 7)

The state determination method according to supplementary note 6, wherein, in the step of acquiring the fixed image, acquiring the fixed images, by detecting a rotation direction and rotation speed of the object, and controlling a rotation direction and rotation speed of the incident light in the first optical device, based on the detected rotation direction and rotation speed.

(Supplementary Note 8)

3. The state determination method according to supplementary note 7, wherein the first optical device has two or more prism elements, is configured such that the two or more prism elements rotate independently to each other about an optical axis of the incident light, and is installed such that the optical axis of the incident light coincides with a normal on the image plane of the image capturing apparatus, and in the step of acquiring the fixed image, rotating the two or more prism elements in opposite directions to each other, and controlling a rotation direction and rotation speed of the two or more prism elements, such that an image captured by the image capturing apparatus through the two or more prism elements rotates at the same rotation speed as the rotation speed of the object in an opposite direction to the rotation direction of the object.

(Supplementary Note 9)

The state determination method according to any one of supplementary notes 6 to 8, wherein a second optical device is disposed between the object and the first optical device, and is configured to track translational movement of the object, take an image of the object and cause the taken image to be incident on the first optical device, and in the step of acquiring the fixed image, detecting a direction of the translational movement of the object and a movement amount at a time of the translational movement, and controlling the second optical device, based on the detected translational direction and translational movement amount.

(Supplementary Note 10)

5. The state determination method according to any one of supplementary notes 6 to 9, wherein, in the step of calculating the out-of-plane displacement, deriving a depth movement amount of the surface of the object that has moved in the normal direction using the difference, and calculating the out-of-plane displacement using the depth movement amount.

(Supplementary Note 11)

A computer-readable recording medium including a program recorded thereon, the program including instructions that cause a computer to carry out:

a step of acquiring, as a fixed image, each of time-series images obtained by continuously shooting a rotating object with an image capturing apparatus via a first optical device that rotates and emits incident light;

a step of calculating a displacement amount of a plurality of specific points on the object, using each of the acquired fixed images, and, with one of the plurality of specific points as a reference specific point, calculating a difference between the displacement amount of the reference specific point and the displacement amount of each specific point other than the reference specific point;

a step of calculating, as an out-of-plane displacement, a displacement of a surface of the object on an image plane of the image capturing apparatus following movement of the object in a normal direction of the image plane, using the difference;

a step of calculating, as an in-plane displacement, a displacement of the surface of the object on the image plane following movement of the surface of the object in a direction along the surface, using the difference and the out-of-plane displacement; and a step of specifying an abnormality of the object, based on a distribution of the in-plane displacement or a temporal change of the out-of-plane displacement.

(Supplementary Note 12)

The computer-readable recording medium according to supplementary note 11, wherein, in the step of acquiring the fixed image, acquiring the fixed images, by detecting a rotation direction and rotation speed of the object, and controlling a rotation direction and rotation speed of the incident light in the first optical device, based on the detected rotation direction and rotation speed.

(Supplementary Note 13)

The computer-readable recording medium according to supplementary note 12, wherein the first optical device has two or more prism elements, is configured such that the two or more prism elements rotate independently to each other about an optical axis of the incident light, and is installed such that the optical axis of the incident light coincides with a normal on the image plane of the image capturing apparatus, and in the step of acquiring the fixed image, rotating the two or more prism elements in opposite directions to each other, and controlling a rotation direction and rotation speed of the two or more prism elements, such that an image captured by the image capturing apparatus through the two or more prism elements rotates at the same rotation speed as the rotation speed of the object in an opposite direction to the rotation direction of the object.

(Supplementary Note 14)

The computer-readable recording medium according to any one of supplementary notes 11 to 13, wherein a second optical device is disposed between the object and the first optical device, and is configured to track translational movement of the object, take an image of the object and cause the taken image to be incident on the first optical device, and in the step of acquiring the fixed image, detecting a direction of the translational movement of the object and a movement amount at a time of the translational movement, and controlling the second optical device, based on the detected translational direction and translational movement amount.

(Supplementary Note 15)

The computer-readable recording medium according to any one of supplementary notes 11 to 14, wherein, in the step of calculating the out-of-plane displacement, deriving a depth movement amount of the surface of the object that has moved in the normal direction using the difference, and calculating the out-of-plane displacement using the depth movement amount.

INDUSTRIAL APPLICABILITY

The present invention is useful for determining a state of a rotating measured object such as a propeller of a wind power generator, a blade of a turbine, or a wheel of a traveling vehicle

REFERENCE SIGNS LIST

1 Fixed image acquisition unit
2 Difference calculation unit

3 Out-of-plane displacement calculation unit
4 In-plane displacement calculation unit
5 Abnormality determination unit
20 Object
20A Rotation axis
21 Blade
22 Spinner
25, 26 Surface
29 Crack
23, 24 Selection region
32, 33 Rotary optical systems
34 Optical axis
35, 36 Dove prism
37, 38 Rotary drive unit
100 State determination apparatus
101 Image capturing apparatus
102, 103 Optical device
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A state determination apparatus comprising:
at least one memory storing instructions; and
at least one processor configured to execute the instructions to:
acquire, as a fixed image, each of time-series images obtained by continuously shooting a rotating object with an image capturing apparatus via a first optical device that rotates and emits incident light;
calculate a displacement amount of a plurality of specific points on the object, using each of the acquired fixed images, and, with one of the plurality of specific points as a reference specific point, calculate a difference between the displacement amount of the reference specific point and the displacement amount of each specific point other than the reference specific point;
calculate, as an out-of-plane displacement, a displacement of a surface of the object on an image plane of the image capturing apparatus following movement of the object in a normal direction of the image plane, using the difference;
calculate, as an in-plane displacement, a displacement of the surface of the object on the image plane following movement of the surface of the object in a direction along the surface, using the difference and the out-of-plane displacement; and
specify an abnormality of the object, based on a distribution of the in-plane displacement or a temporal change of the out-of-plane displacement.
2. The state determination apparatus according to claim 1, further at least one processor configured to execute the instructions to:
acquire the fixed images, by detecting a rotation direction and rotation speed of the object, and controlling a rotation direction and rotation speed of the incident light in the first optical device, based on the detected rotation direction and rotation speed.

3. The state determination apparatus according to claim 2, further at least one processor configured to execute the instructions to:
wherein the first optical device has two or more prism elements, is configured such that the two or more prism elements rotate independently to each other about an optical axis of the incident light, and is installed such that the optical axis of the incident light coincides with a normal on the image plane of the image capturing apparatus, and
further at least one processor configured to execute the instructions to:
rotate the two or more prism elements in opposite directions to each other, and control a rotation direction and rotation speed of the two or more prism elements, such that an image captured by the image capturing apparatus through the two or more prism elements rotates at the same rotation speed as the rotation speed of the object in an opposite direction to the rotation direction of the object.
4. The state determination apparatus according to claim 1, wherein a second optical device is disposed between the object and the first optical device, and is configured to track translational movement of the object, take an image of the object and cause the taken image to be incident on the first optical device, and
further at least one processor configured to execute the instructions to:
detect a direction of the translational movement of the object and a movement amount at a time of the translational movement, and control the second optical device, based on the detected translational direction and translational movement amount.
5. The state determination apparatus according to claim 1, further at least one processor configured to execute the instructions to:
derive a depth movement amount of the surface of the object that has moved in the normal direction using the difference, and calculate the out-of-plane displacement using the depth movement amount.
6. A state determination method comprising:
acquiring, as a fixed image, each of time-series images obtained by continuously shooting a rotating object with an image capturing apparatus via a first optical device that rotates and emits incident light;
calculating a displacement amount of a plurality of specific points on the object, using each of the acquired fixed images, and, with one of the plurality of specific points as a reference specific point, calculating a difference between the displacement amount of the reference specific point and the displacement amount of each specific point other than the reference specific point;
calculating, as an out-of-plane displacement, a displacement of a surface of the object on an image plane of the image capturing apparatus following movement of the object in a normal direction of the image plane, using the difference;
calculating, as an in-plane displacement, a displacement of the surface of the object on the image plane following movement of the surface of the object in a direction along the surface, using the difference and the out-of-plane displacement; and
specifying an abnormality of the object, based on a distribution of the in-plane displacement or a temporal change of the out-of-plane displacement.

7. The state determination method according to claim 6, wherein, in the acquiring the fixed image, acquiring the fixed images, by detecting a rotation direction and rotation speed of the object, and controlling a rotation direction and rotation speed of the incident light in the first optical device, based on the detected rotation direction and rotation speed.

8. The state determination method according to claim 7, wherein the first optical device has two or more prism elements, is configured such that the two or more prism elements rotate independently to each other about an optical axis of the incident light, and is installed such that the optical axis of the incident light coincides with a normal on the image plane of the image capturing apparatus, and in the acquiring the fixed image, rotating the two or more prism elements in opposite directions to each other, and controlling a rotation direction and rotation speed of the two or more prism elements, such that an image captured by the image capturing apparatus through the two or more prism elements rotates at the same rotation speed as the rotation speed of the object in an opposite direction to the rotation direction of the object.

9. The state determination method according to claim 6, wherein a second optical device is disposed between the object and the first optical device, and is configured to track translational movement of the object, take an image of the object and cause the taken image to be incident on the first optical device, and in the acquiring the fixed image, detecting a direction of the translational movement of the object and a movement amount at a time of the translational movement, and controlling the second optical device, based on the detected translational direction and translational movement amount.

10. The state determination method according to claim 6, wherein, in the calculating the out-of-plane displacement, deriving a depth movement amount of the surface of the object that has moved in the normal direction using the difference, and calculating the out-of-plane displacement using the depth movement amount.

11. A non-transitory computer-readable recording medium including a program recorded thereon, the program including instructions that cause a computer to carry out:

acquiring, as a fixed image, each of time-series images obtained by continuously shooting a rotating object with an image capturing apparatus via a first optical device that rotates and emits incident light;

calculating a displacement amount of a plurality of specific points on the object, using each of the acquired fixed images, and, with one of the plurality of specific points as a reference specific point, calculating a difference between the displacement amount of the reference specific point and the displacement amount of each specific point other than the reference specific point;

calculating, as an out-of-plane displacement, a displacement of a surface of the object on an image plane of the image capturing apparatus following movement of the object in a normal direction of the image plane, using the difference;

calculating, as an in-plane displacement, a displacement of the surface of the object on the image plane following movement of the surface of the object in a direction along the surface, using the difference and the out-of-plane displacement; and specifying an abnormality of the object, based on a distribution of the in-plane displacement or a temporal change of the out-of-plane displacement.

12. The non-transitory computer-readable recording medium according to claim 11, wherein, in the acquiring the fixed image, acquiring the fixed images, by detecting a rotation direction and rotation speed of the object, and controlling a rotation direction and rotation speed of the incident light in the first optical device, based on the detected rotation direction and rotation speed.

13. The non-transitory computer-readable recording medium according to claim 12, wherein the first optical device has two or more prism elements, is configured such that the two or more prism elements rotate independently to each other about an optical axis of the incident light, and is installed such that the optical axis of the incident light coincides with a normal on the image plane of the image capturing apparatus, and in the acquiring the fixed image, rotating the two or more prism elements in opposite directions to each other, and controlling a rotation direction and rotation speed of the two or more prism elements, such that an image captured by the image capturing apparatus through the two or more prism elements rotates at the same rotation speed as the rotation speed of the object in an opposite direction to the rotation direction of the object.

14. The non-transitory computer-readable recording medium according to claim 11, wherein a second optical device is disposed between the object and the first optical device, and is configured to track translational movement of the object, take an image of the object and cause the taken image to be incident on the first optical device, and in the acquiring the fixed image, detecting a direction of the translational movement of the object and a movement amount at a time of the translational movement, and controlling the second optical device, based on the detected translational direction and translational movement amount.

15. The non-transitory computer-readable recording medium according to claim 11, wherein, in the calculating the out-of-plane displacement, deriving a depth movement amount of the surface of the object that has moved in the normal direction using the difference, and calculating the out-of-plane displacement using the depth movement amount.

* * * * *